United States Patent
Shin et al.

(10) Patent No.: US 7,639,518 B2
(45) Date of Patent: Dec. 29, 2009

(54) DEVICE AND METHOD FOR CONTROLLING POWER CONVERTING DEVICE

(75) Inventors: Kentarou Shin, Yokohama (JP); Yasuaki Hayami, Yokosuka (JP); Kraisorn Throngnumchai, Yokohama (JP); Toshihiro Kai, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 251 days.

(21) Appl. No.: 11/785,925

(22) Filed: Apr. 20, 2007

(65) Prior Publication Data
US 2007/0279948 A1    Dec. 6, 2007

(30) Foreign Application Priority Data
Apr. 26, 2006   (JP)   ............................. 2006-122093
Feb. 13, 2007   (JP)   ............................. 2007-031584

(51) Int. Cl.
*H02M 1/12* (2006.01)
(52) U.S. Cl. ...................................................... 363/41
(58) Field of Classification Search ............. 363/39–41, 363/95, 97, 98, 131, 132; 318/798, 801, 318/805–812
See application file for complete search history.

(56) References Cited

U.S. PATENT DOCUMENTS

| 4,459,534 | A | * | 7/1984 | Nagase et al. | ............... | 318/808 |
| 4,825,131 | A | * | 4/1989 | Nozaki et al. | ................. | 318/52 |
| 6,166,514 | A | * | 12/2000 | Ando et al. | ................. | 318/811 |
| 6,815,924 | B1 | * | 11/2004 | Iura et al. | .................... | 318/727 |
| 7,005,825 | B2 | * | 2/2006 | Eguchi | ....................... | 318/727 |

FOREIGN PATENT DOCUMENTS

| JP | 7-99795 A | 4/1995 |
| JP | 2001-037248 A | 2/2001 |

* cited by examiner

*Primary Examiner*—Matthew V Nguyen
(74) *Attorney, Agent, or Firm*—Foley & Lardner LLP

(57) ABSTRACT

A control device for a power converting device which performs PWM on an output from a DC power supply and produces an output of AC power, including: a current controller which converts a given current command value into a voltage command value; a carrier generator which generates a PWM carrier; a PWM generator which generates a PWM signal to be fed to the power converting device according to the voltage command value and the PWM carrier; a frequency controller which effects a change in the frequency of the PWM carrier from the carrier generator; and a current control gain controller which effects a change in the current control gain of the current controller according to the change in the frequency of the PWM carrier. The current control gain of the current controller is changed according to the change in the frequency of the PWM carrier from the carrier generator.

12 Claims, 26 Drawing Sheets

FIG. 22
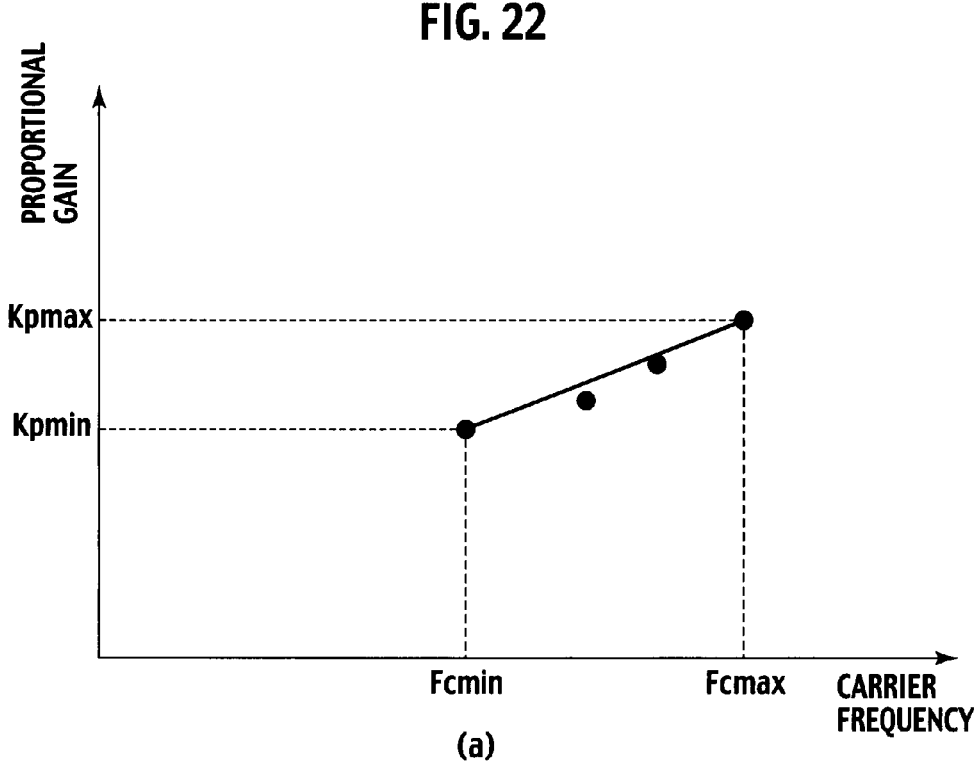
(a)
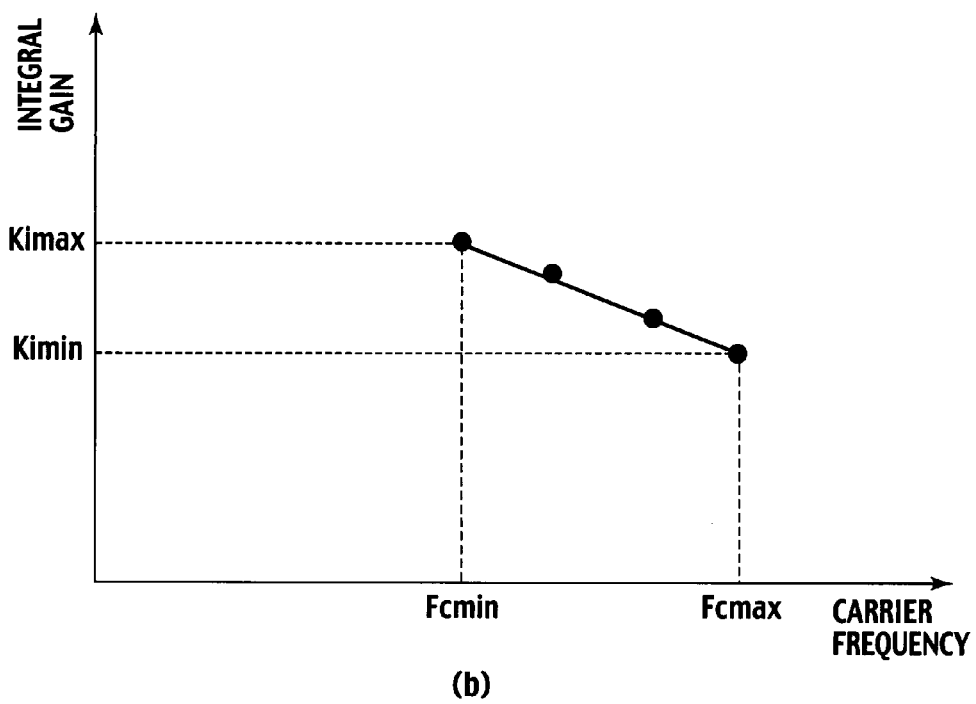
(b)

DEVICE AND METHOD FOR CONTROLLING POWER CONVERTING DEVICE

BACKGROUND OF THE INVENTION

1. Field of the Invention

The present invention relates to a device and method for controlling a power converting device for performing pulse width modulation (PWM) on an output from a direct current (DC) power supply and thereby producing an output of alternating current (AC) power, and is concerned with a technique for preventing the occurrence of a malfunction due to a change in the frequency of a pulse width modulation carrier.

2. Description of the Related Art

Apparatuses (such as a current control stepping motor) driven by a pulse width modulated signal are configured to control its operation by changing a duty ratio of a current waveform fed through the apparatus (or by performing pulse width modulation (hereinafter referred to simply as "PWM")). This PWM-based controlling apparatus produces switching noise of a fundamental control frequency and higher harmonics thereof, because of doing switching to turn on or off a load driving current with a train of pulse width modulated pulses. For example when the apparatus is mounted on a vehicle, the switching noise can possibly have an influence on hearing of a radio mounted on the identical vehicle and render it difficult to hear the radio or cause the radio to produce a harsh grating noise, or have an adverse effect on operation of other vehicle-mounted digital instruments.

Japanese Unexamined Patent Application Publication No. 7(1995)-99795 discloses a stepping motor control device designed for the purpose of reducing the above-mentioned noise. The device subjects the drive current pulse train (or a control clock) previously subjected to the PWM to control the current control stepping motor to additional frequency modulation with a sinusoidal wave having a lower frequency than a control clock frequency. This effects the spread of spectrum components of the noise over a desired frequency band, thus reducing the influence of the noise upon the vehicle-mounted apparatus or instruments.

Advances in digital processors and digital circuit techniques make it possible to use a central processing unit (CPU) or the like to execute operations for calculating a PWM pattern, and make it possible to use a digital timer and a digital comparator circuit to generate the PWM pattern with precision, thus facilitating PWM pattern generation even if the pattern is complicated.

As shown in FIG. 1 of Japanese Unexamined Patent Application Publication No. 7(1995)-99795, a power converting device is used for current control, which is configured to effect a periodic change in the frequency of a pulse width modulation carrier in order to attenuate the noise components. However, in such a power converting device, a change in a current calculation period according to the change in the carrier frequency (or period) takes place in the device that performs current sampling, control calculations or the like in synchronization with a PWM generation period. Due to this, current control characteristics change according to whether the carrier period is short or long. Consequently, periodic variations caused by the change in the frequency of the pulse width modulation carrier occur as variations in an output current waveform, as shown in FIG. 18 to be discussed later (in which Tm denotes a change period). The occurrence of the variations in the output current waveform from the power converting device can possibly lead to variations in operation of the load driven by the output from the power converting device (e.g., variations in torque of the motor).

SUMMARY OF THE INVENTION

The present invention has been made in consideration for the above-described problems inherent in the related art. An object of the present invention is to provide a device and method for controlling a power converting device, which are designed to prevent the power converting device from impairing its control characteristics even when the power converting device effects a change in the frequency of a pulse width modulation carrier.

In order to solve the foregoing problems, the present invention provides a control device for a power converting device which performs pulse width modulation (PWM) on an output from a direct current power supply and thereby produces an output of alternating current power. The control device includes the followings: a current controller which converts a given current command value into a voltage command value; a carrier generator which generates a pulse width modulation (PWM) carrier; a PWM generator which generates a pulse width modulated (PWM) signal to be fed to the power converting device according to the voltage command value and the PWM carrier; a frequency controller which effects a change in the frequency of the PWM carrier from the carrier generator; and a current control gain controller which effects a change in the current control gain of the current controller according to the change in the frequency of the PWM carrier. In the control device, the current control gain of the current controller is changed according to the change in the frequency of the PWM carrier from the carrier generator. According to the present invention, the control device suppresses the occurrence of periodic variations due to the change in the PWM carrier frequency in an output current waveform from the power converting device, by effecting a change in the current control gain for conversion of the current command value to the voltage command value according to the change in the PWM carrier frequency. Thereby, the control device suppresses torque and other variations occurring in a load driven by the power converting device.

Incidentally, there is a regular relation between the PWM carrier frequency and the current control gain, as will be described later with reference to FIG. 8. Since this relation can be given by, for example, a linear approximate expression, the expression can be used to facilitate changing the current control gain according to the change in the PWM carrier frequency.

As for a transient response to the current command value, the control device includes a deviation detector which detects a deviation of an output current from the power converting device from the given current command value. Thus, the control device effects a change in the current control gain of the current controller according to the change in the PWM carrier frequency from the carrier generator, and also effects a change in the range of the current control gain according to the deviation. Thereby, the control device improves the transient characteristics of the output current waveform from the power converting device.

BRIEF DESCRIPTION OF THE DRAWINGS

The invention will now be described with reference to the accompanying drawings wherein:

FIG. 22(a) is a characteristic plot showing the relation between the carrier frequency and the proportional gain. FIG. 22(b) is a characteristic plot showing the relation between the carrier frequency and the integral gain;

DETAILED DESCRIPTION OF THE PREFERRED EMBODIMENTS

Figure 1:
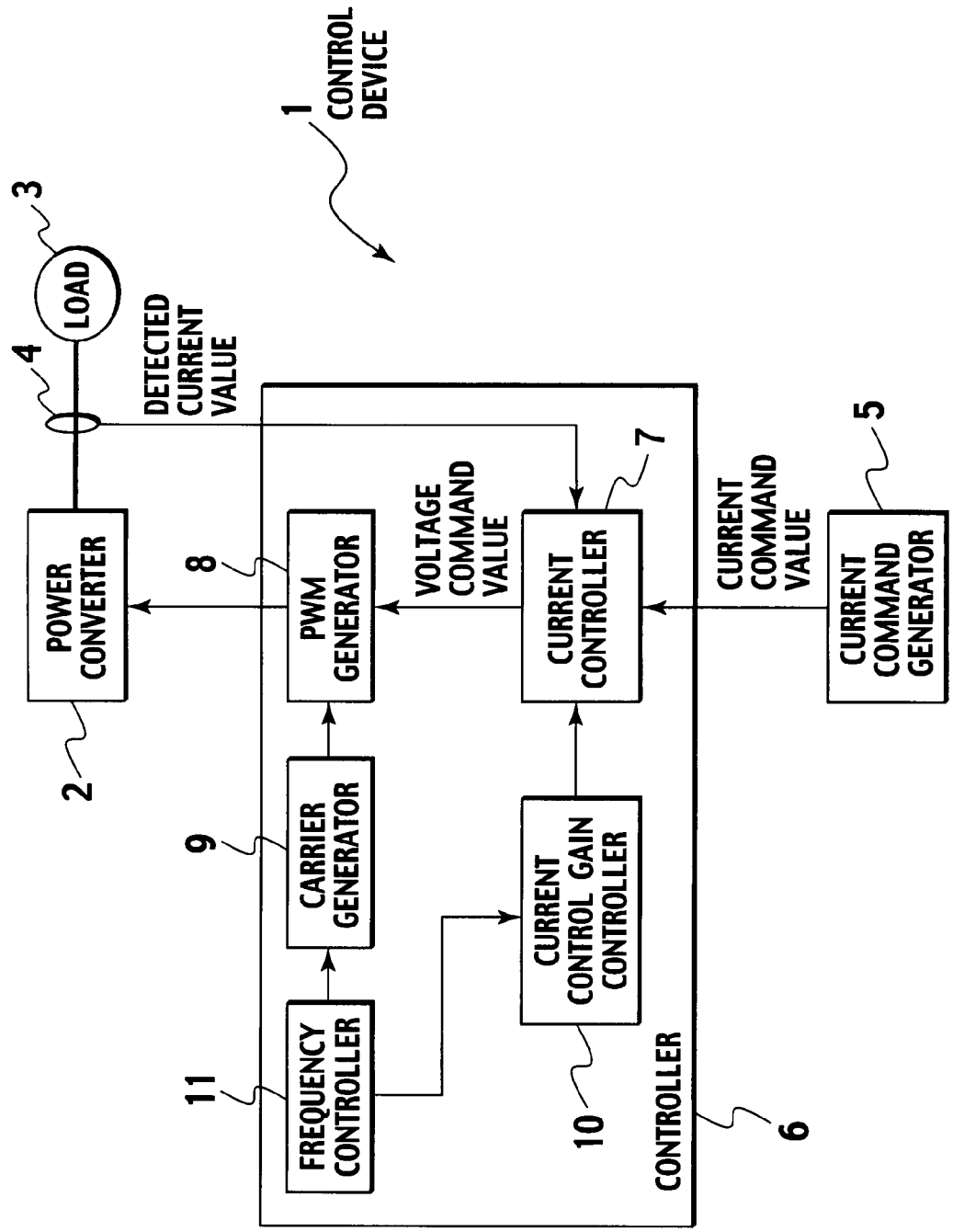
FIG. 1 is a block diagram showing a device for controlling a power converting device according to a first embodiment of the present invention.

Embodiments of the present invention will be explained below with reference to the drawings, wherein like members are designated by like reference characters.

First Embodiment

FIG. 1 is a block diagram showing an example of a power converting device and a device for controlling the same according to a first embodiment of the present invention.

Referring to FIG. 1, a power converter 2 is, for example, a PWM inverter, which is driven by a pulse width modulated signal (hereinafter referred to simply as a "PWM signal") from a controller 6 to thereby supply alternating current power to a load 3 (e.g., a motor). A current detector 4 detects an alternating current flowing from the power converter 2 to the load 3 and sends the detected value to the controller 6. A current command generator 5 gives a command signal as to a current for driving the load 3. The current command generator 5 sends a current command value to the controller 6 according to the amount of accelerator operation or the like, for example when the power converting device is mounted on a vehicle.

The controller 6 is configured of a current controller 7, a PWM generator 8, a carrier generator 9, a current control gain controller 10, and a frequency controller 11. The current controller 7 performs arithmetic on the current command value from the current command generator 5 and the detected current value from the current detector 4, and outputs a voltage command value. The PWM generator 8 generates a PWM signal composed of an ON/OFF signal by comparing the voltage command value from the current controller 7 to a carrier signal from the carrier generator 9, and then outputs the PWM signal to the power converter 2. The power converter 2 supplies the alternating current power to the load 3 by performing on-off control on its internal switching element in accordance with the input PWM signal.

The frequency controller 11 performs control so that the carrier generator 9 generates variable carrier frequencies. The current control gain controller 10 effects a change in the current control gain of the current controller 7 according to the change in the carrier frequency.

Detailed description will be provided below with regard to blocks shown in FIG. 1.

Figure 2:
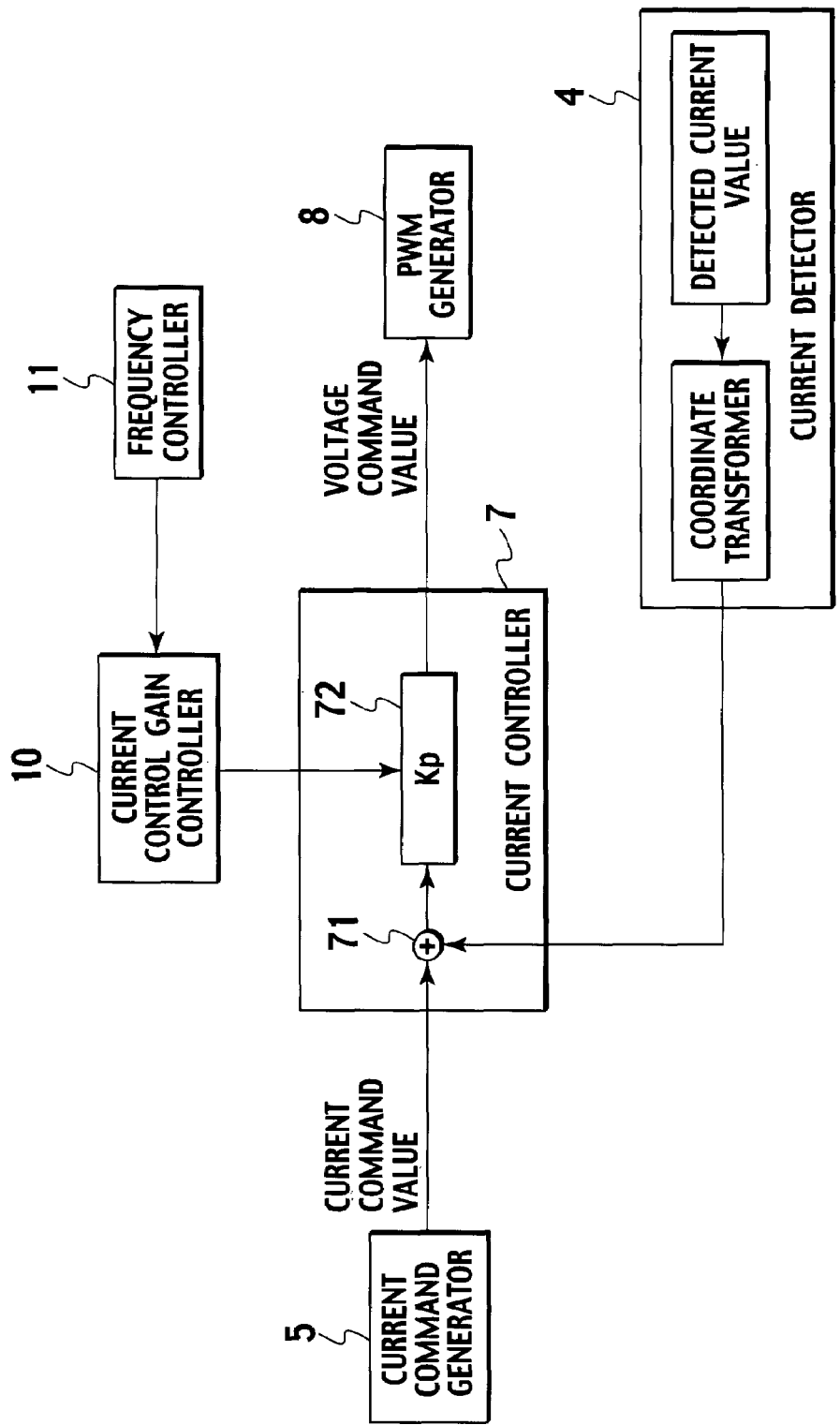
FIG. 2 is a block diagram of a current controller.

FIG. 2 is a block diagram showing the configuration of the current controller 7 within the controller 6. As shown in FIG. 2, the current controller 7 includes a calculator 71 that calculates a deviation of the detected current value from the current detector 4 from the current command value from the current command generator 5, and a proportional controller 72 that outputs the voltage command value by performing proportional control (P-control). A proportional term of the proportional control, as employed by the proportional controller 72, is set to change according to a signal from the current control gain controller 10, so that the output voltage command value changes according to the change in the carrier frequency. Although the proportional term of the proportional control is given in FIG. 2 as an example of the current control gain of the current controller 7, other control systems (e.g., proportional-plus-integral control) may be employed.

As employed herein, the detected current value from the current detector 4 is obtained in the following manner. For example, the current detector 4 detects the values of U-phase, V-phase and W-phase currents (or three-phase alternating current as given herein as an example) which the PWM inverter supplies to the motor that acts as the load, and a coordinate transformer performs transformation (or three-phase-to-two-phase transformation) to transform the U-phase, V-phase and W-phase current values into the d-coordinate and q-coordinate current values.

Figure 3:
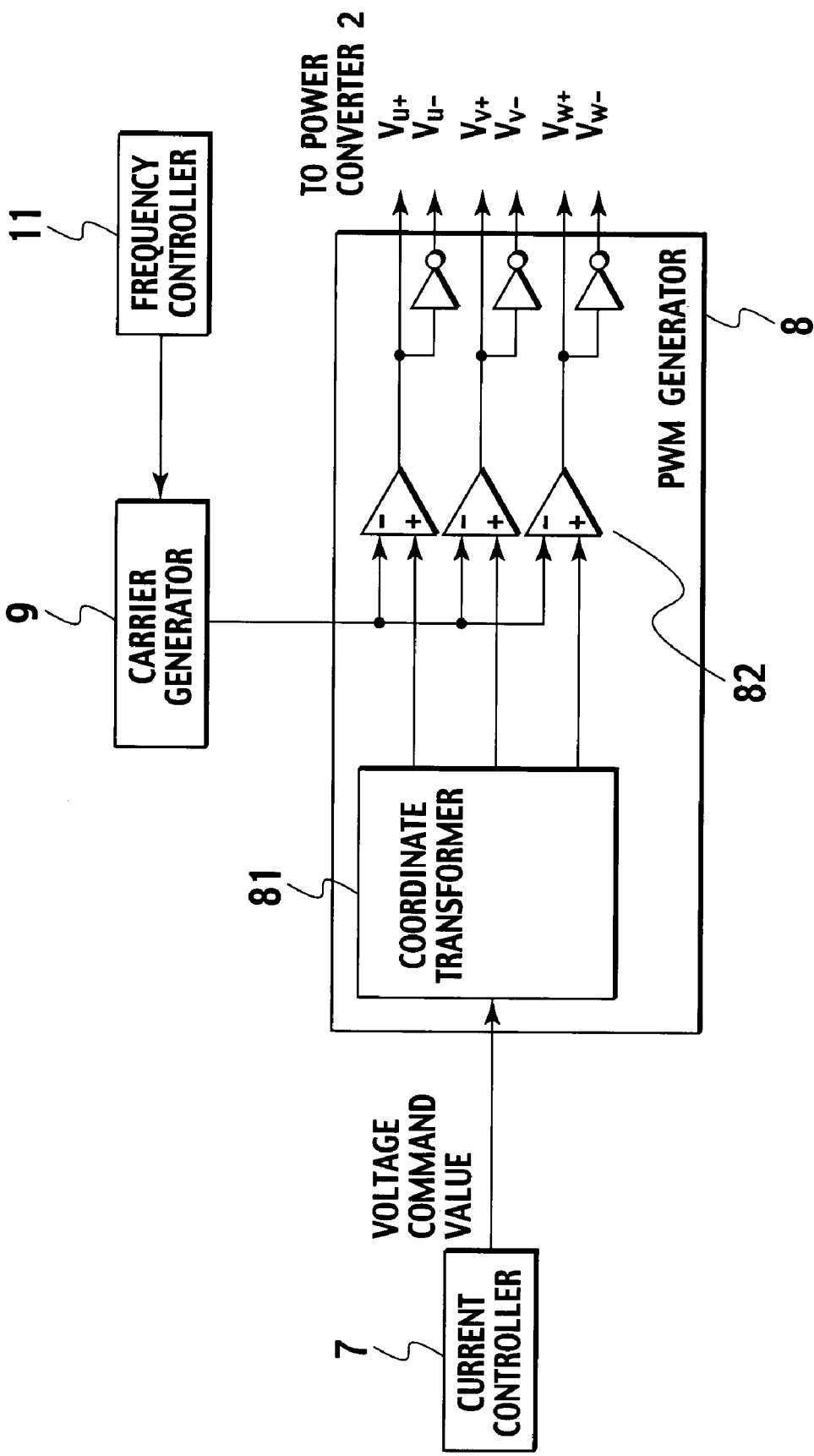
FIG. 3 is a block diagram of a PWM generator.

FIG. 3 is a block diagram showing the configuration of the PWM generator 8 within the controller 6. As shown in FIG. 3, the PWM generator 8 includes a coordinate transformer 81 that performs coordinate transformation of the voltage command value outputted by the current controller 7, and a comparator 82 that compares the relative magnitudes of the coordinate-transformed voltage command value and the carrier from the carrier generator 9.

The coordinate transformer 81 performs two-phase-to-three-phase coordinate transformation to transform the voltage command value fed from the current controller 7 from the d-coordinate and q-coordinate values into the U-phase, V-phase and W-phase values.

The comparator 82 compares the coordinate-transformed voltage command value to the carrier signal from the carrier generator 9, and outputs to the power converter 2 the PWM signal composed of the ON/OFF signal (Vu$^+$, Vu$^-$, Vv$^+$, Vv$^-$, Vw$^+$, Vw$^-$) according to the relative magnitudes thereof.

Figure 4:
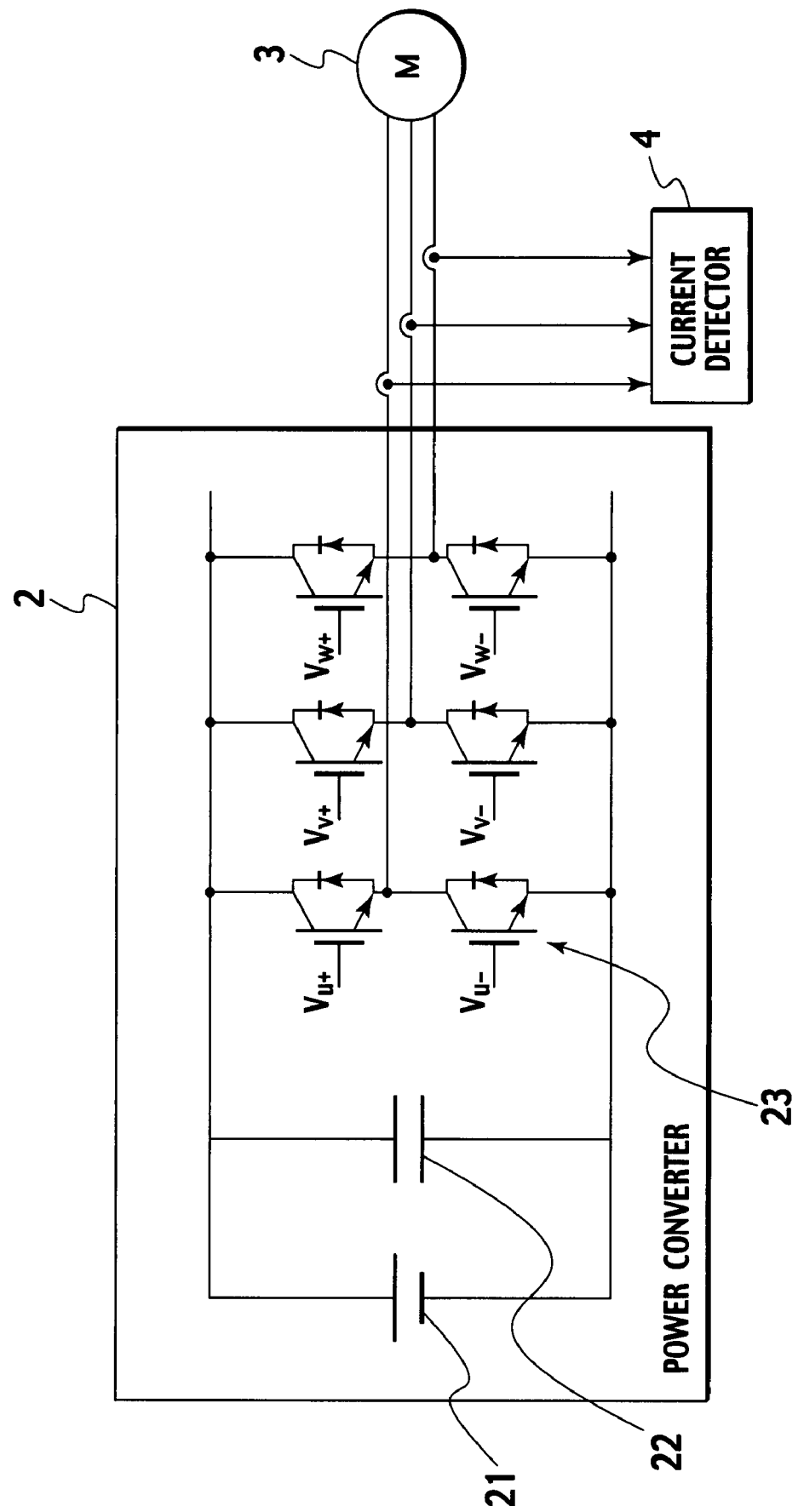
FIG. 4 is a circuit diagram of a power converter.

FIG. 4 is a circuit diagram showing the configuration of the power converter 2 shown in FIG. 1. As shown in FIG. 4, the power converter 2 includes a direct current power supply 21, a capacitor 22, and six switching elements 23 (for the three-phase alternating current). The switching elements 23 are each made of a semiconductor device such as an insulated gate bipolar transistor (IGBT). The switching elements 23 select a positive or negative electrode of a direct current power supply formed of the direct current power supply 21 and the capacitor 22 in accordance with the PWM signal (Vu$^+$, Vu$^-$, Vv$^+$, Vv$^-$, Vw$^+$, Vw$^-$) from the comparator 82 of the PWM generator 8, and the selected electrode supplies power to U-phase, V-phase and W-phase electrodes of the load 3 (or the motor).

The current detector 4 detects the values of the U-phase, V-phase and W-phase currents which the power converter 2 (or the PWM inverter) supplies to the load 3 (or the motor).

In addition, the frequency controller 11 shown in FIG. 1 effects a change in the carrier frequency in accordance with the timing of the peak (or maximum value) or valley (or minimum value) of an input triangular wave from the carrier generator 9. In this case, description will be provided taking an instance where the triangular wave is used as the carrier and the carrier frequency is modulated to provide a triangular wave form.

Figure 5:
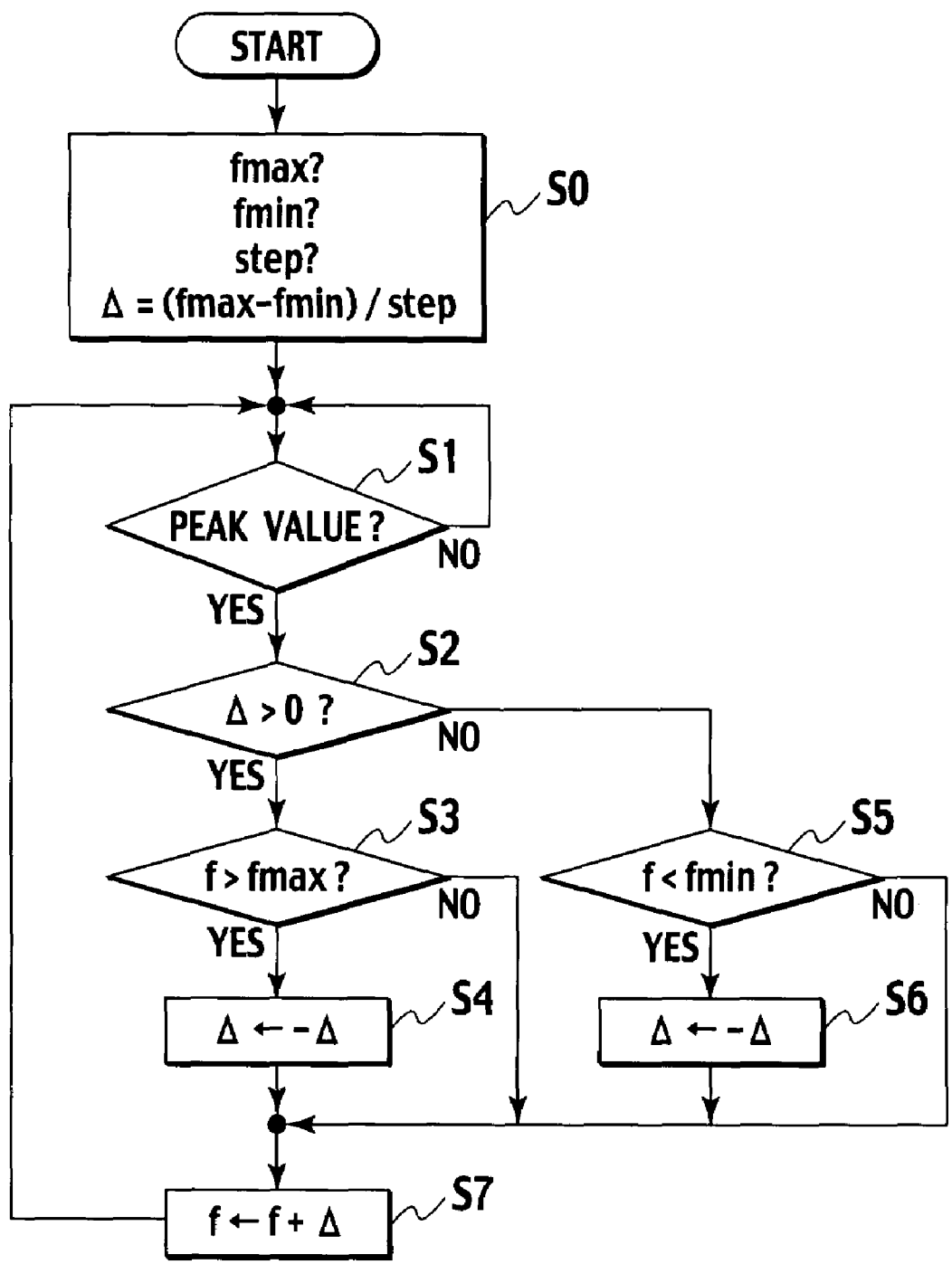
FIG. 5 is a flowchart showing a calculating process executed by a frequency controller.
Figure 6:
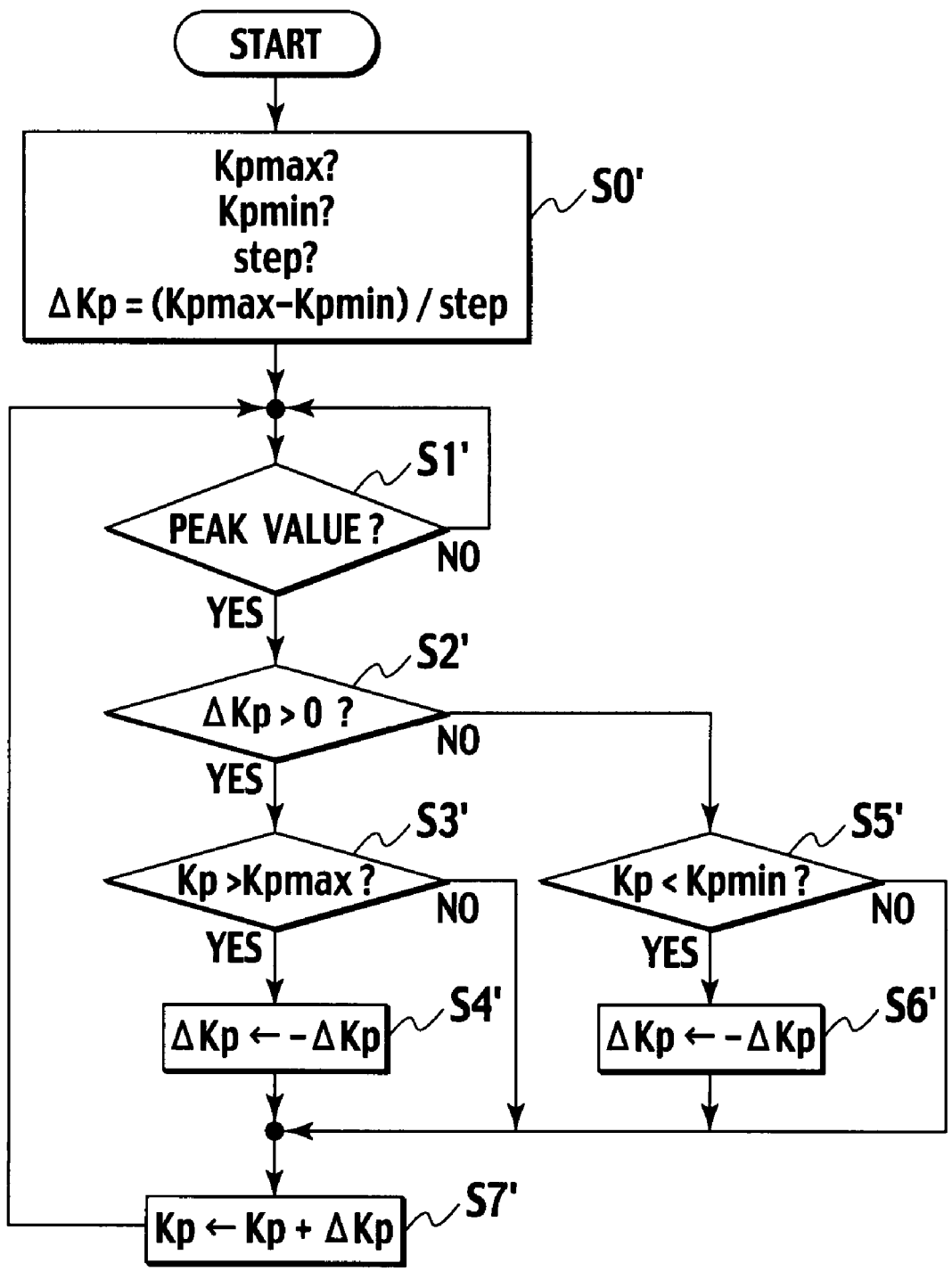
FIG. 6 is a flowchart showing a calculating process executed by a current control gain controller.

In the case of the power converting device having the configuration as described above, the frequency controller 11 executes a frequency control process shown in FIGS. 5 and 6, thereby enabling the prevention of the occurrence of a malfunction due to the change in the carrier frequency without impairing the efficiency of the motor.

Firstly, detailed description will be provided with reference to a flowchart shown in FIG. 5 with regard to how the frequency controller 11 operates to execute the frequency control process.

First at step S0, the frequency controller 11 determines an upper limit value fmax and a lower limit value fmin of a carrier frequency f to be changed by the frequency controller 11, how many steps a band of frequencies between the values fmax and fmin should be divided into, and a change value $\Delta$ ($\Delta$=(fmax−fmin)/step). This process step starts with input of a triangular carrier wave from the carrier generator 9 to the frequency controller 11, and is followed by step S1.

At step S1, the frequency controller 11 determines whether the input carrier from the carrier generator 9 takes on the maximum value or the minimum value, that is, whether or not the carrier signal value is equal to the peak value. When the frequency controller 11 determines that the carrier is equal to the maximum or minimum value, the control process then proceeds to step S2.

At step S2, the frequency controller 11 determines whether the change value $\Delta$ of the carrier frequency f is positive or negative. When the change value $\Delta$ is negative, the control process proceeds to step S5. When the change value $\Delta$ is positive, the control process proceeds to step S3.

At step S3, the frequency controller 11 determines whether or not the frequency f reaches the upper limit value fmax. When the determination is made that the frequency f does not reach the upper limit value fmax, the control process proceeds to step S7 so that the change value $\Delta$ does not change sign. When the frequency f reaches the upper limit value fmax, the control process proceeds to step S4.

At step S4, the frequency controller 11 reverses the sign of the change value $\Delta$ of the frequency f ($\Delta \leftarrow -\Delta$) so as to decrease the frequency f at the time of next calculation and thereafter. This brings step S4 to completion, and the control process proceeds from step S4 to step S7.

At step S5, the frequency controller 11 determines whether or not the frequency f reaches the lower limit value fmin. When the determination is made that the frequency f does not reach the lower limit value fmin, the control process proceeds to step S7 so that the change value $\Delta$ does not change sign. When the frequency f reaches the lower limit value fmin, the control process proceeds to step S6.

At step S6, the frequency controller 11 reverses the sign of the change value $\Delta$ of the frequency f so as to increase the frequency f at the time of next calculation and thereafter. This brings step S6 to completion, and the control process proceeds from step S6 to step S7.

At step S7, the frequency controller 11 adds the change value $\Delta$ determined through the above process steps to the present frequency f to calculate a next period of the carrier frequency f, which in turn is inputted to the carrier generator 9. In other words, the frequency f is controlled so as to increase or decrease monotonically by the change value $\Delta$ each time calculation takes place. This brings step S7 to completion, and the frequency control process returns from step S7 to step S1.

A series of frequency control process steps mentioned above enables a monotonic decrease in the carrier frequency f within a given time period and a monotonic increase in the carrier frequency f within a next time period, that is, the modulation of the carrier frequency f into the triangular wave form.

FIG. 6 is a flowchart showing a calculating process that takes place in the current control gain controller 10.

The process of FIG. 6 by the current control gain controller 10 is the same as the above process of FIG. 5, except that an upper limit value Kpmax, a lower limit value Kpmin and a change value ΔKp of a current control gain Kp replace the upper limit value fmax, the lower limit value fmin and the change value Δ of the frequency f, respectively. Steps S0', S1', S2' to S7' of FIG. 6 correspond to steps S0 to S7 of FIG. 5, respectively. In other words, the current control gain Kp is controlled so as to increase or decrease monotonically by the change value ΔKp each time calculation takes place.

Execution of the process of FIG. 6 enables changing the current control gain Kp of the current controller 7 in the triangular wave form according to the change in the carrier frequency f.

Description will now be given with reference to FIG. 7 with regard to the upper limit value Kpmax and the lower limit value Kpmin of the current control gain shown in FIG. 6.

Figure 7:
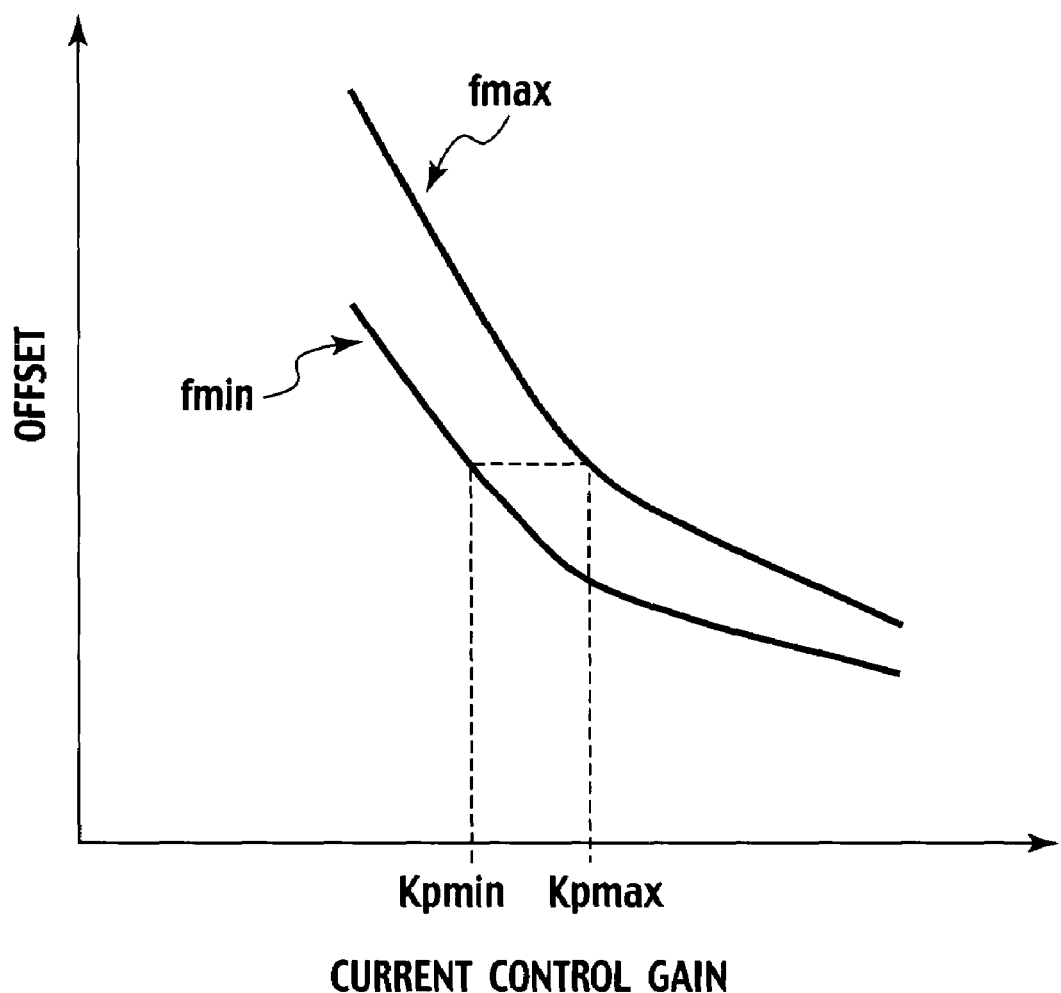
FIG. 7 is a characteristic plot showing the relation between a current control gain and an offset of a current value.

FIG. 7 shows a change in deviation due to the carrier frequency. In FIG. 7, the horizontal axis indicates the current control gain of the current controller 7 as supplied with an input of a constant current command value, and the vertical axis indicates a difference between the current command value and the detected current value (that is, an offset or a deviation).

As can be seen from FIG. 7, when the current control gain is set constant, the deviation becomes larger as the carrier frequency f becomes higher (or gets closer to the upper limit value fmax), while the deviation becomes smaller as the carrier frequency f becomes lower (or gets closer to the lower limit value fmin). It can be therefore seen that the deviation can be kept constant when the current control gain is controlled so as to increase with increasing carrier frequency f or decrease with decreasing carrier frequency f. Incidentally, control of the following stage is equivalent to that the current control gain is set so as to decrease with lengthening carrier period or increase with shortening carrier period since the reciprocal of the frequency is the period when the carrier frequency is set based on the period.

Figure 8:
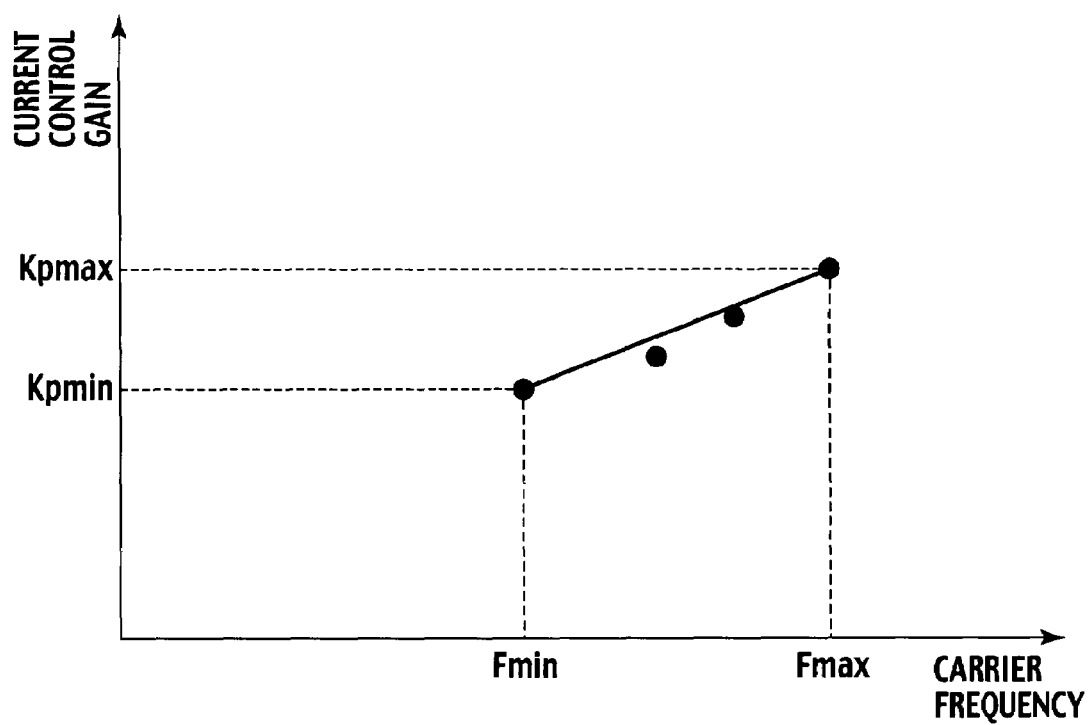
FIG. 8 is a characteristic plot showing the relation between a carrier frequency and the current control gain.

It has been experimentally shown that the above relation exists, that is, there is a given regular relation between the carrier frequency and the current control gain that permit keeping the deviation constant. FIG. 8 is a plot showing the above relation. In FIG. 8, the vertical axis indicates the current control gain, and the horizontal axis indicates the carrier frequency. As can be seen from FIG. 8, the carrier frequency is substantially linearly proportional to the current control gain.

Although it is possible that current control gains are brought into correspondence with all varying carrier frequencies (or periods) to determine the current control gain that makes the deviation constant, a linear approximate expression obtained from the relation shown in FIG. 8 can be used to determine the current control gain from the upper and lower limit values of the current control gain. When the upper and lower limit values of the carrier frequency (or period) are determined from FIG. 8, the upper and lower limit values fmax and fmin of the carrier frequency (or period) that makes the deviation constant can be therefore set in combination with the corresponding upper and lower limit values Kpmax and Kpmin of the current control gain.

Figure 9:
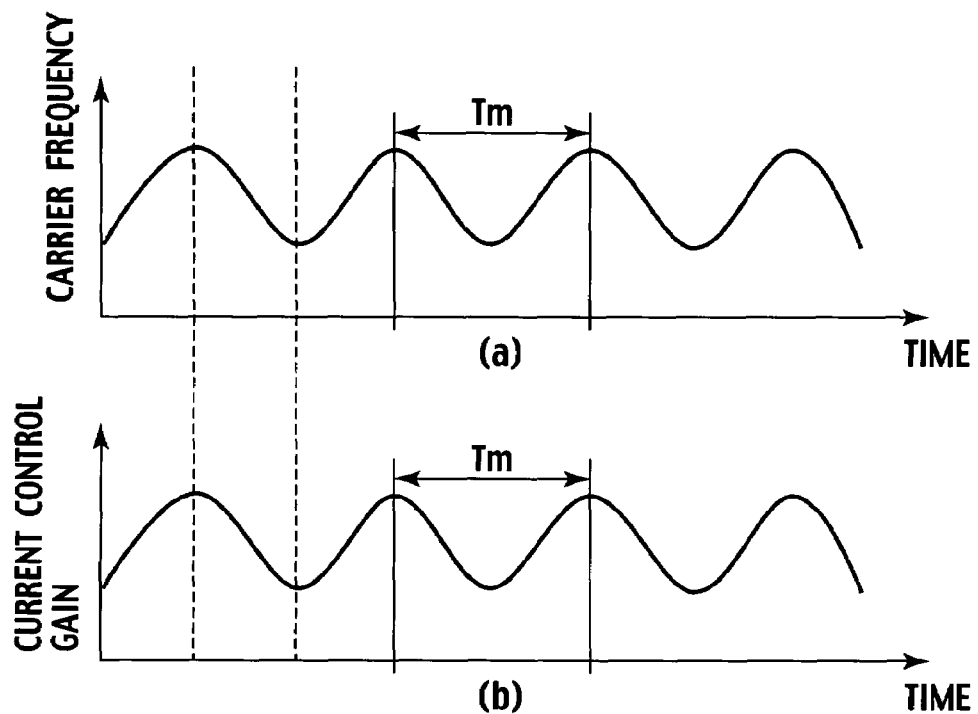
FIGS. 9(a) and 9(b) are graphs showing a change in the current control gain with respect to time, which occurs when the carrier frequency is modulated to provide a sinusoidal wave form.
Figure 10:
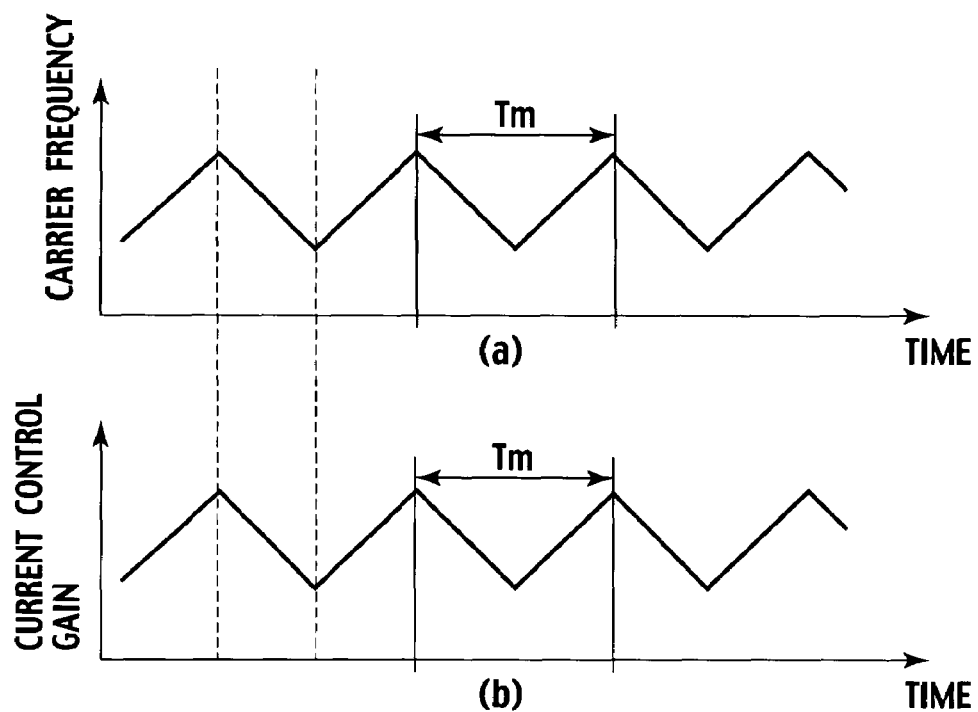
FIGS. 10(a) and 10(b) are graphs showing a change in the current control gain with respect to time, which occurs when the carrier frequency is modulated to provide a triangular wave form.
Figure 11:
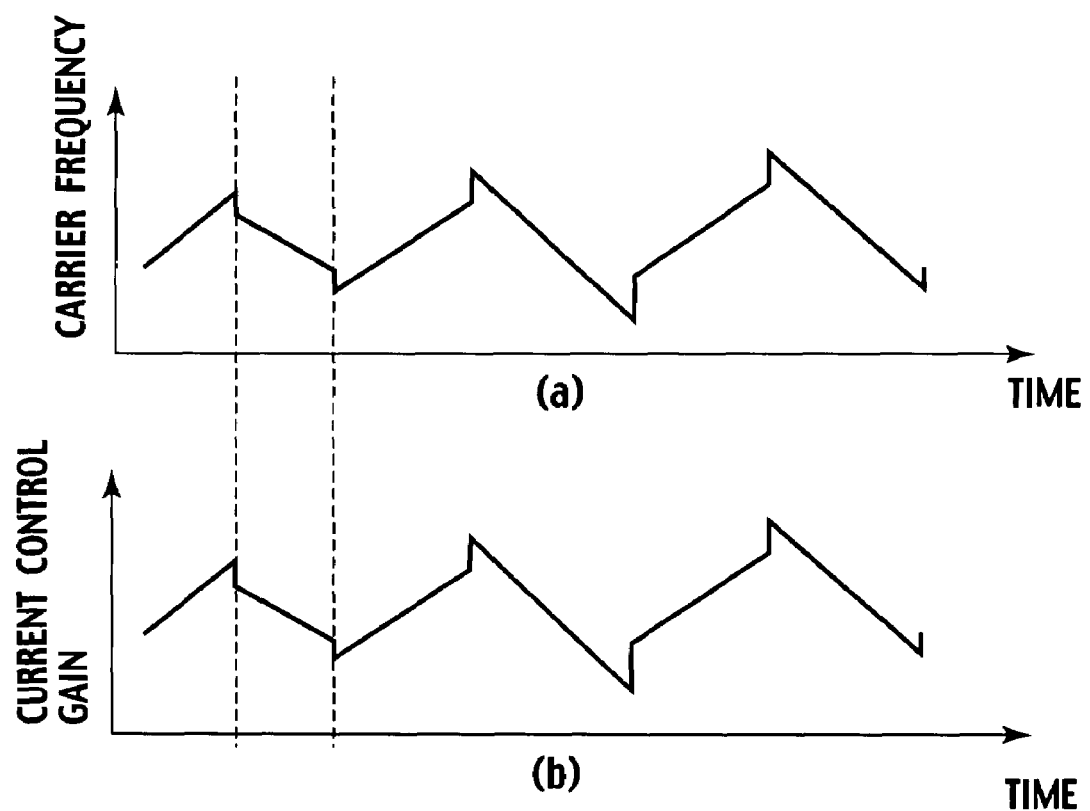
FIGS. 11(a) and 11(b) are graphs showing a change in the current control gain with respect to time, which occurs when the carrier frequency is randomly changed.

FIGS. 9(a) to 11(b) show the changes in the carrier frequency (or period) and the current control gain with respect to time, which occur when the control method described above is employed. FIGS. 9(a) and 9(b) are graphs showing the change in the current control gain, which occurs when the carrier frequency is modulated to provide a sinusoidal waveform. FIGS. 10(a) and 10(b) are graphs showing the change in the current control gain, which occurs when the carrier frequency is modulated to provide a triangular wave form. FIGS. 11(a) and 11(b) are graphs showing the change in the current control gain with respect to time, which occurs when the carrier frequency is randomly changed. FIGS. 9(a), 10(a) and 11(a) show the change in the carrier frequency with respect to time, and FIGS. 9(b), 10(b) and 11(b) show the change in the current control gain with respect to time. In these drawings, Tm denotes a change period.

As described above, the current control gain is changed according to the change in the carrier frequency, and thus the current control gain also changes in conjunction with the change in the carrier frequency. This enables suppressing variations in an output current from the power converting device due to the change in the carrier frequency.

Moreover, the proportional control is used as the current controller 7. Thus, easy control of the current control gain can be accomplished by changing the proportional term of the proportional control.

Moreover, the carrier frequency may be modulated to provide the triangular wave form. This facilitates calculating and setting the frequency and the current control gain, thus enabling the suppression of the variations in the output current from the power converting device.

Second Embodiment

Figure 12:
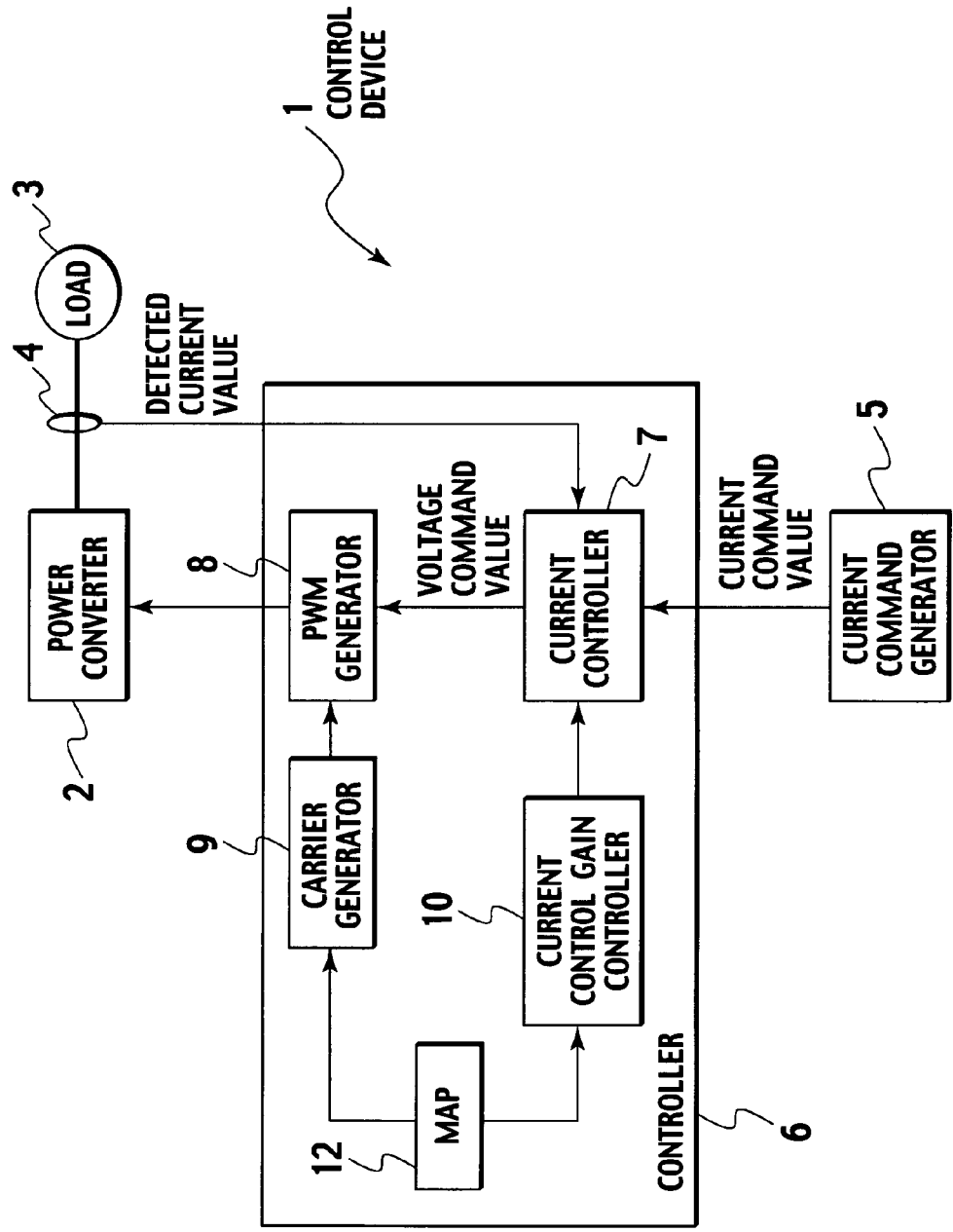
FIG. 12 is a block diagram of a device for controlling a power converting device according to a second embodiment of the present invention.

FIG. 12 is a block diagram showing a device for controlling a power converting device according to a second embodiment of the present invention.

The control device according to the second embodiment is provided with a map 12 that stores the correlation between a carrier frequency and a current control gain, in place of the frequency controller 11 shown in FIG. 1. A value read out from the map 12 is used to perform control in order for the carrier generator 9 to generate variable frequencies. In addition, a value from the map 12 is used to cause the current control gain controller 10 to change the current control gain of the current controller 7 according to a change in the carrier frequency. This makes it possible to effectively prevent the occurrence of a malfunction due to the change in the carrier frequency. The configuration of the other components is the same as that shown in FIG. 1 previously discussed.

As described above, the carrier frequency is mapped to the current control gain, and the carrier frequency and the current control gain are changed in accordance with the map. This achieves the effect of facilitating setting a combination of a complicated carrier frequency and a current control gain.

Third Embodiment

Figure 13:
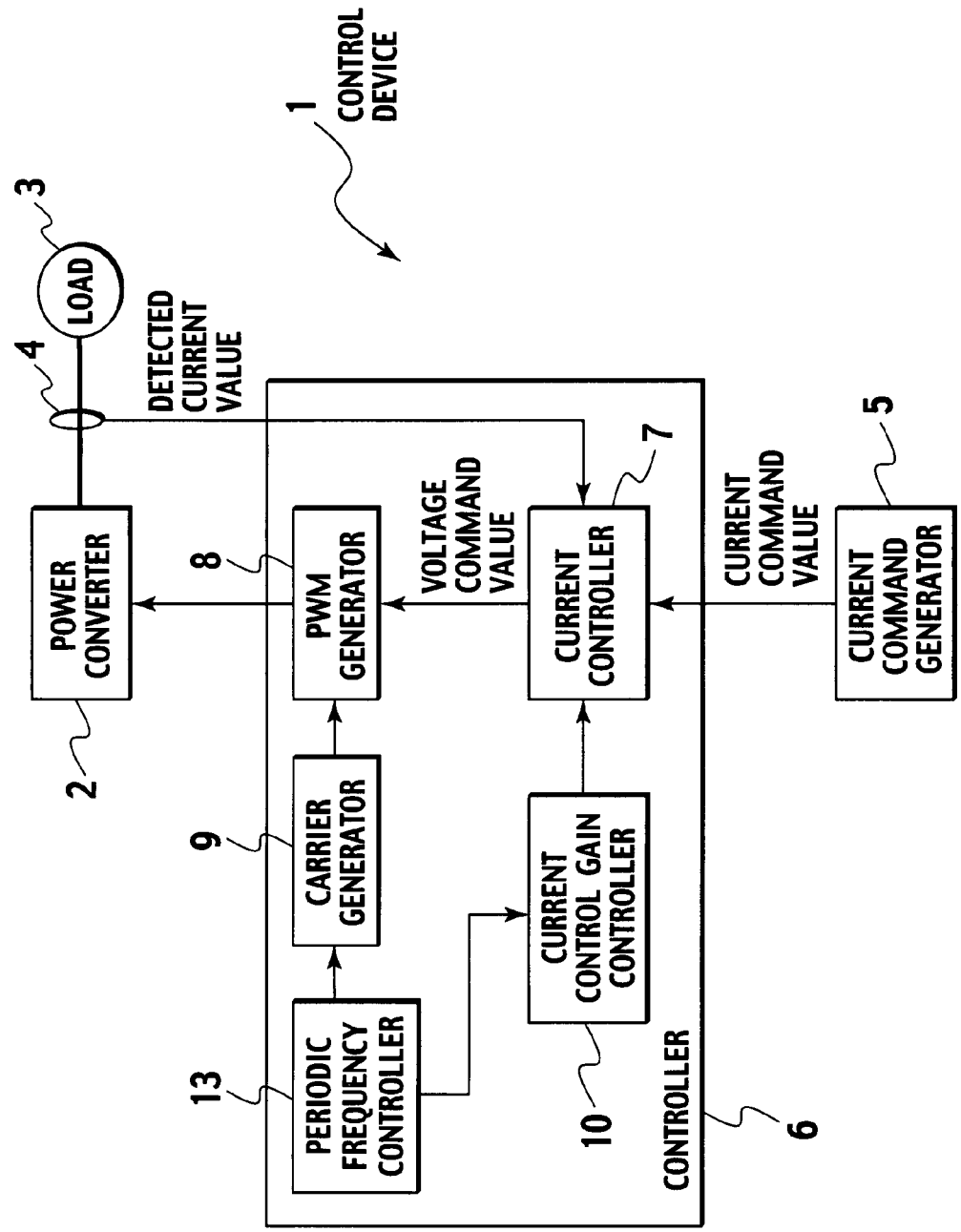
FIG. 13 is a block diagram of a device for controlling a power converting device according to a third embodiment of the present invention.

FIG. 13 is a block diagram showing a device for controlling a power converting device according to a third embodiment of the present invention.

The control device according to the third embodiment is provided with a periodic frequency controller 13 that effects a periodic change in a frequency, in place of the frequency controller 11 shown in FIG. 1.

The periodic frequency controller 13 periodically modulates a carrier frequency to thereby facilitate calculating and estimating the carrier frequency. This enables changing a current control gain each time the carrier frequency changes, thus making it possible to effectively prevent the occurrence of a malfunction due to the carrier frequency.

Figure 14:
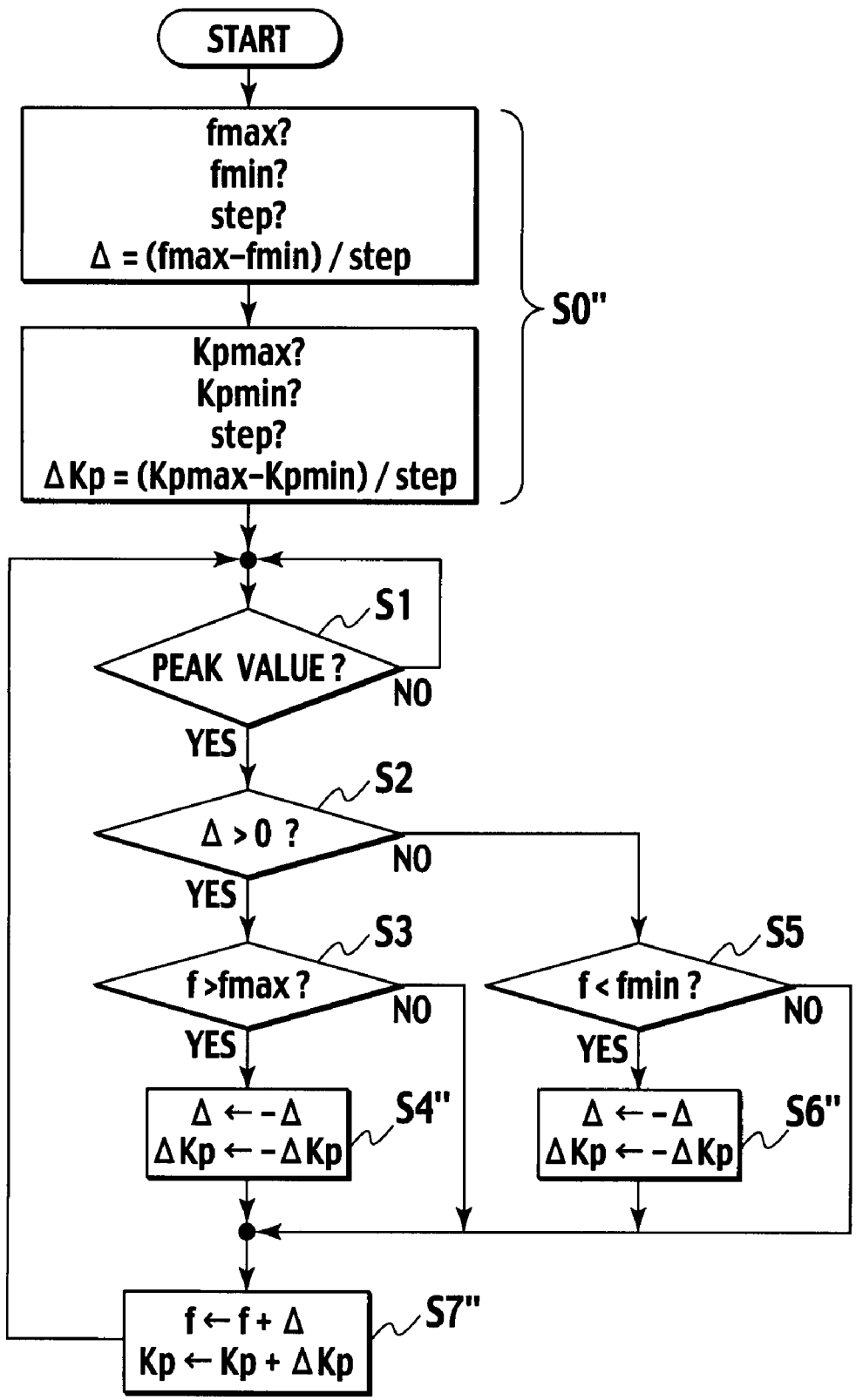
FIG. 14 is a flowchart showing a calculating process executed by the control device shown in FIG. 13.

FIG. 14 is a flowchart showing a method of controlling a current control gain according to the third embodiment.

The flowchart of FIG. 14 is formed of a combination of the flowcharts of FIGS. 5 and 6 previously discussed. Step S0" of FIG. 14 involves executing step S0 of FIG. 5 plus gain initialization shown in FIG. 6 (or step S0' of FIG. 6). Steps S4", S6" and S7" involve executing a change of the carrier frequency f in steps S4, S6, S7 of FIG. 5 concurrently with a change of the current control gain Kp in steps S4', S6', S7' of FIG. 5. In this case, the carrier frequency may be changed into any form, such as a curve form, unless the amount of change in the carrier frequency becomes extremely large.

Incidentally, the map 12 shown in FIG. 12 can be created by storing in a map the results of calculations shown in FIG. 14.

As described above, the periodic change of the carrier frequency facilitates calculating and estimating the carrier frequency, thus enables changing the current control gain according to the change in the carrier frequency, and hence enables suppressing the variations in the output current from the power converting device.

Fourth Embodiment

Figure 15:
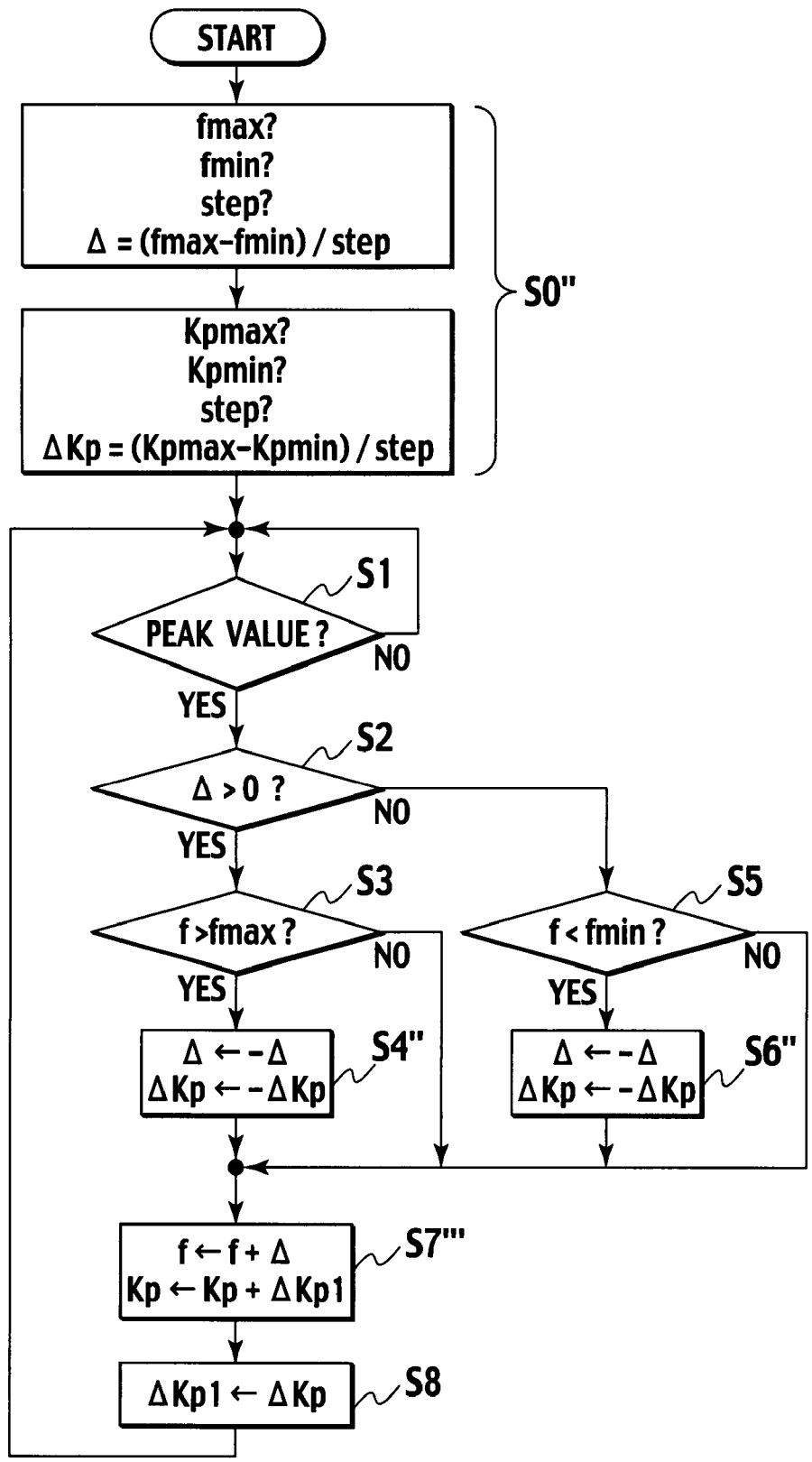
FIG. 15 is a flowchart showing a calculating process according to a fourth embodiment of the present invention.

FIG. 15 is a flowchart of assistance in explaining a control method for a device for controlling a power converting device according to a fourth embodiment of the present invention.

The control method according to the fourth embodiment is adapted to delay and change a current control gain in accordance with a delay in a carrier at the occurrence of the delay in the carrier.

In the case of the control device 1 shown in FIG. 1, a carrier fed from the carrier generator 9 to the PWM generator 8 can possibly lag due to being buffered or the calculation time. In the case of this configuration, process steps (or steps S7''' and S8 of FIG. 15) corresponding to step S7" of FIG. 14 are executed. Specifically, the change value ΔKp of the current control gain is temporarily held as ΔKp1 at the end of calculation (at step S8 of FIG. 15), and the value ΔKp1 is used for next calculation (at step S7''' of FIG. 15). In other words, the process shown in FIG. 15 is adapted to calculate the voltage command value by using the value of the current control gain delayed by the duration of one calculation cycle, as compared to the calculating process shown in FIG. 14. Specifically, when a delay occurs in a PWM carrier fed from the carrier generator 9 to the PWM generator 8 in the power converting device, the current control gain value indicated by a command issued to the current controller 7 from the current control gain controller 10 is held for the duration of one calculation cycle, and thus the held current control gain value is used for the next calculation in order for the current controller 7 to calculate the voltage command value. Performing this operation enables changing the current control gain in accordance with the change in the carrier frequency, thus making it possible to effectively prevent the occurrence of a malfunction resulting from the carrier frequency due to a delay in calculation or the like.

Figure 16:
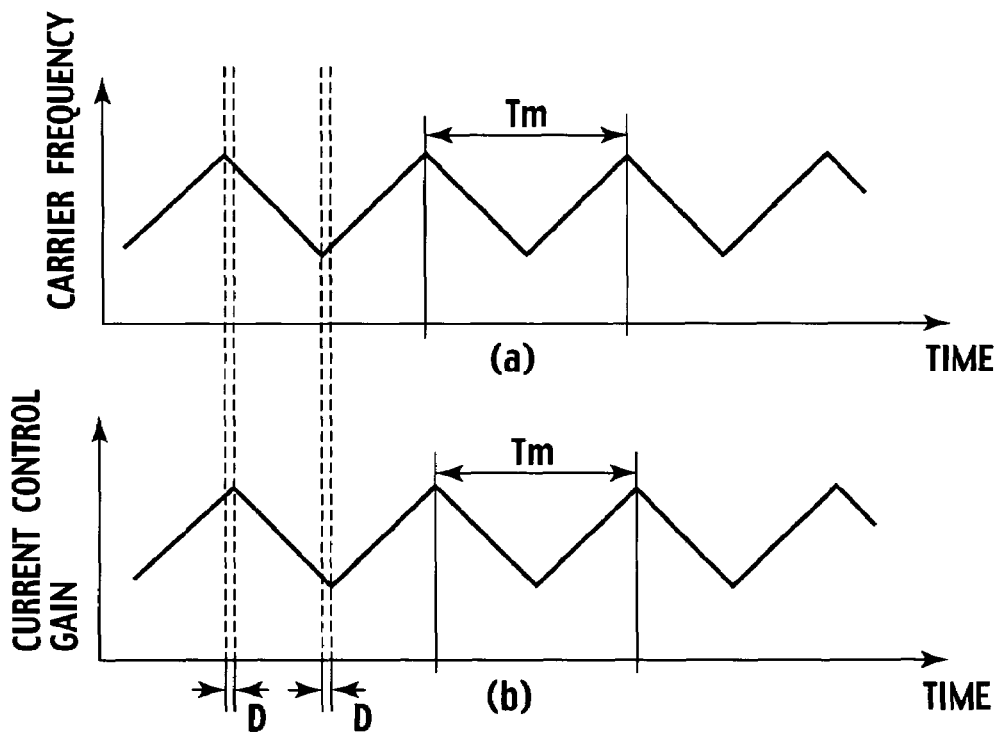
FIGS. 16(a) and 16(b) are graphs showing changes in the carrier frequency and the current control gain with respect to time, respectively.

FIGS. 16(a) and 16(b) show the changes in the carrier frequency and the current control gain, respectively, which are effected by the above-mentioned process. In FIGS. 16(a) and 16(b), D denotes a delay equivalent to the duration of one calculation cycle.

Although an instance where the current control gain is held for the duration of one calculation cycle is given hereinabove, the current control gain may be held for the duration of a plurality of calculations according to the degree of the delay in the carrier.

Description will now be given with regard to a change in motor phase current which occurs when the current control gain is fixed (or in the case of a comparative example), and a change in motor phase current which occurs when the current control gain is changed according to the change in the carrier frequency (or in the case of the present invention).

Figure 17:
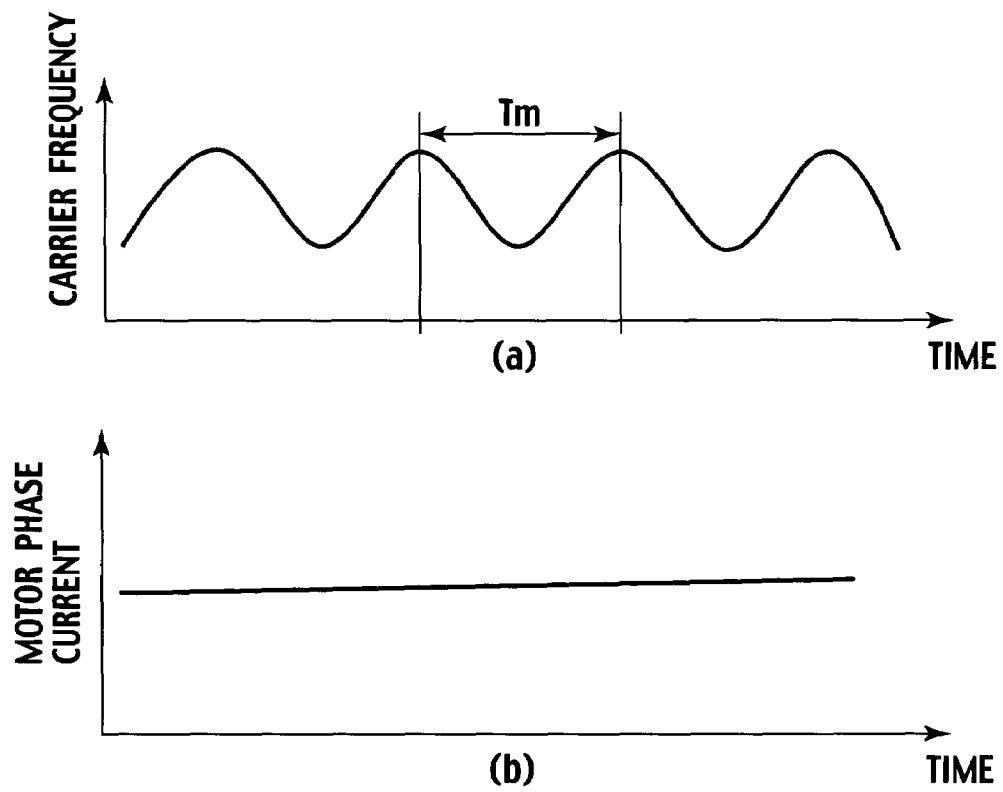
FIGS. 17(a) and 17(b) are charts showing a change in a carrier with respect to time and the waveform of a motor phase current with respect to time, respectively, in the case of the present invention.
Figure 18:
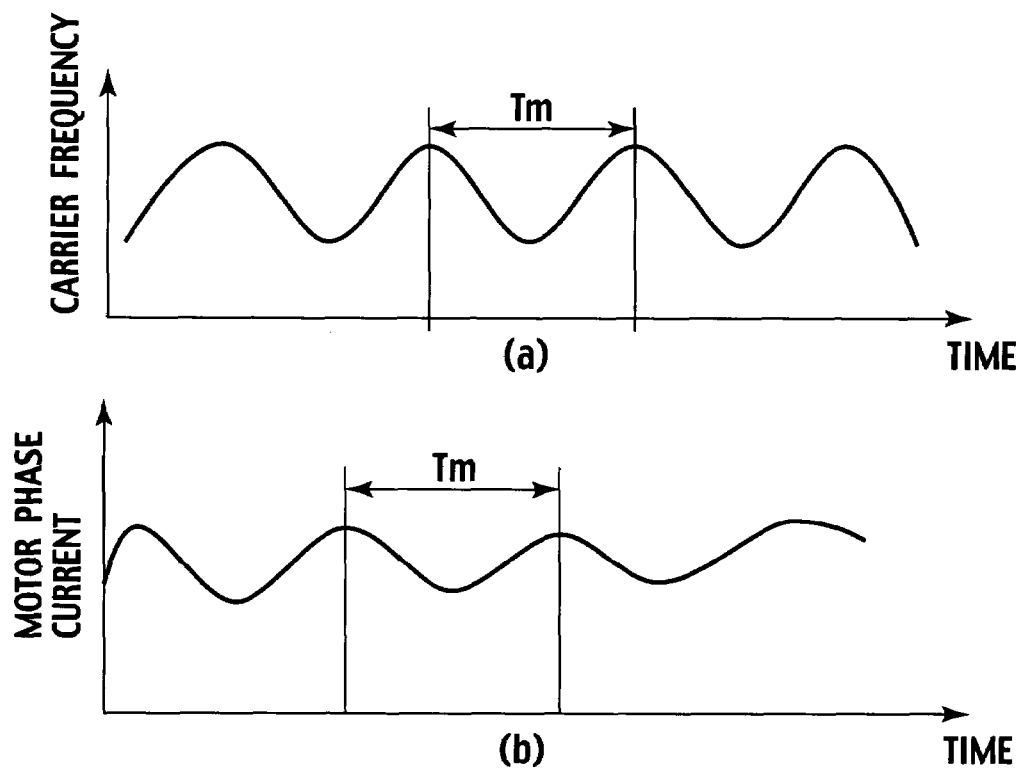
FIGS. 18(a) and 18(b) are charts showing a change in the carrier with respect to time and the waveform of the motor phase current with respect to time, respectively, in the case of a comparative example.

FIGS. 17(a) and 17(b) and FIGS. 18(a) and 18(b) are plots showing the characteristics of the changes in the carrier frequency and the current, which are exhibited when the carrier frequency is modulated with a sinusoidal wave. FIGS. 17(a) and 17(b) show the characteristics possessed by the present invention, and FIGS. 18(a) and 18(b) show the characteristics possessed by the comparative example.

FIGS. 17(a) and 18(a) show the change in the carrier frequency with respect to time. In FIGS. 17(a) and 18(a), Tm denotes the period of the change with respect to time. FIG. 17(b) shows the waveform of the motor phase current with respect to time, which develops when the current control gain is changed according to the change in the carrier frequency (or in the case of the present invention). FIG. 18(b) shows the waveform of the motor phase current with respect to time, which develops when the current control gain is fixed (or in the case of the comparative example).

As can be seen from FIGS. 17(a) to 18(b), the motor phase current, as observed in the case of the comparative example, varies according to variations in the carrier frequency, whereas the motor phase current, as observed in the case of the present invention, remains stable almost in a straight waveform even if the carrier frequency varies periodically. From this, it can be seen that the method of the present invention suppresses variations in the current.

The same proceeds for situations where the carrier frequency is modulated into a triangular wave form or in a random fashion. Specifically, the current control gain as changed according to the change in the carrier frequency enables suppressing the variations in the motor phase current and hence effectively preventing the occurrence of a malfunction due to the carrier frequency, as compared to the current control gain as fixed.

Fifth Embodiment

With reference to the first to fourth embodiments previously described, an instance is given where there arises a steady state in which the current command value is substantially constant and there is a single deviation of the output current from the current command value. A fifth embodiment is adapted to meet a situation where there arises a transition state in which the current command value varies and there are plural varying deviations of the output current from the current command value (that is, the plural deviations exist and each varies).

Figure 19:
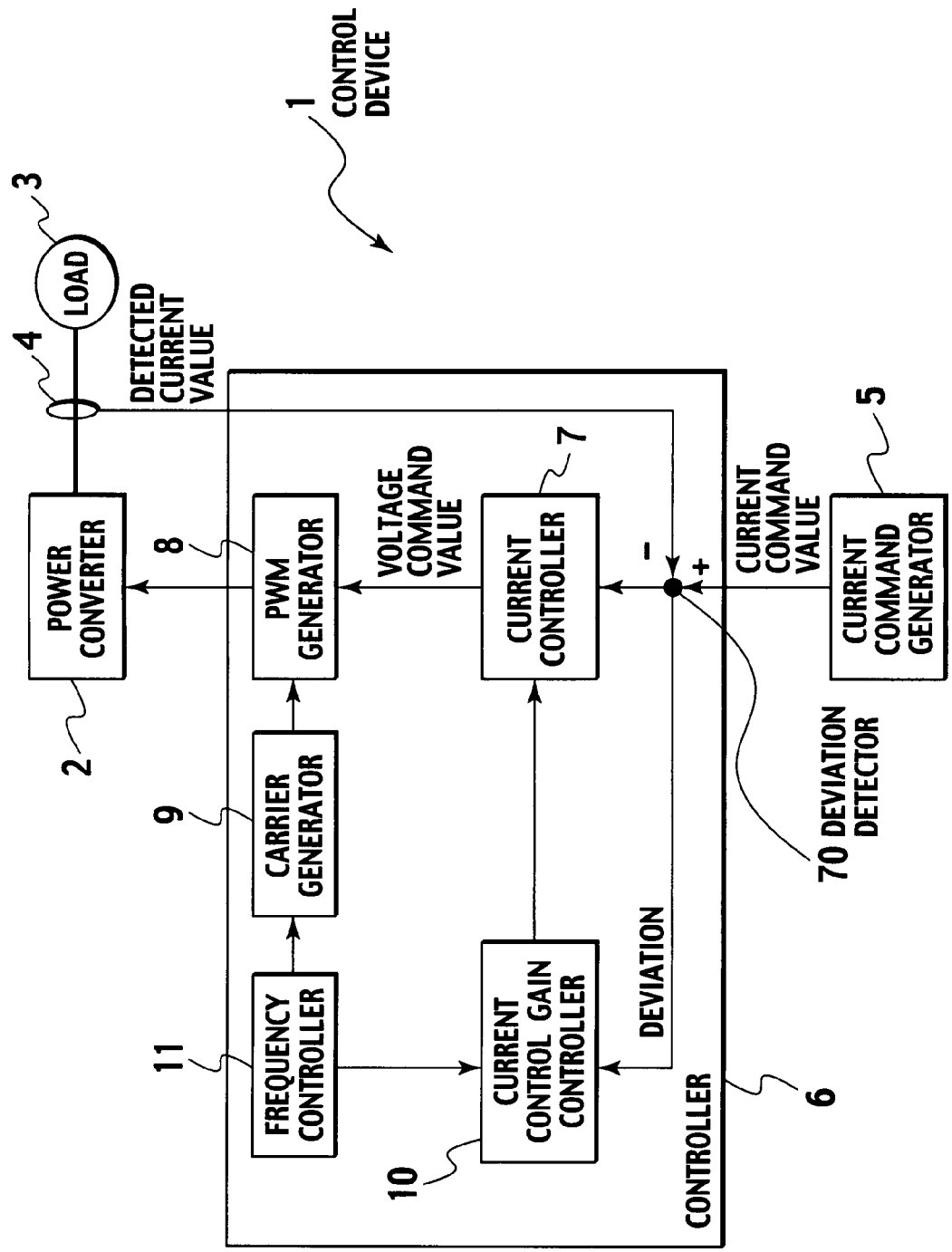
FIG. 19 is a block diagram showing a device for controlling a power converting device according to a fifth embodiment of the present invention.

FIG. 19 is a block diagram showing a device for controlling a power converting device according to the fifth embodiment of the present invention. In FIG. 19, substantially the same parts are designated by the same reference numerals shown in FIG. 1. Description will be provided below with regard to a different configuration from the configuration shown in FIG. 1.

The control device according to the fifth embodiment is provided with a deviation detector 70, externally to the current controller 7, which detects the deviation of the detected current value from the current command value. With this configuration, the current control gain controller 10 is controlled according to the detected deviation so as to change the current control gain of the current controller 7 according to the change in the carrier frequency, and also to change the range of the current control gain according to the deviation (e.g., the mean value of bands in which the current control gain is changed). In other words, the control device is configured to change the range of the current control gain according to the change in the deviation, because there are plural varying deviations of the output current from the current command value in the transition state in which the current command value varies. This enables achieving an improvement in transition characteristics of an output current waveform from the power converting device.

Detailed description will be provided below.

Figure 20:
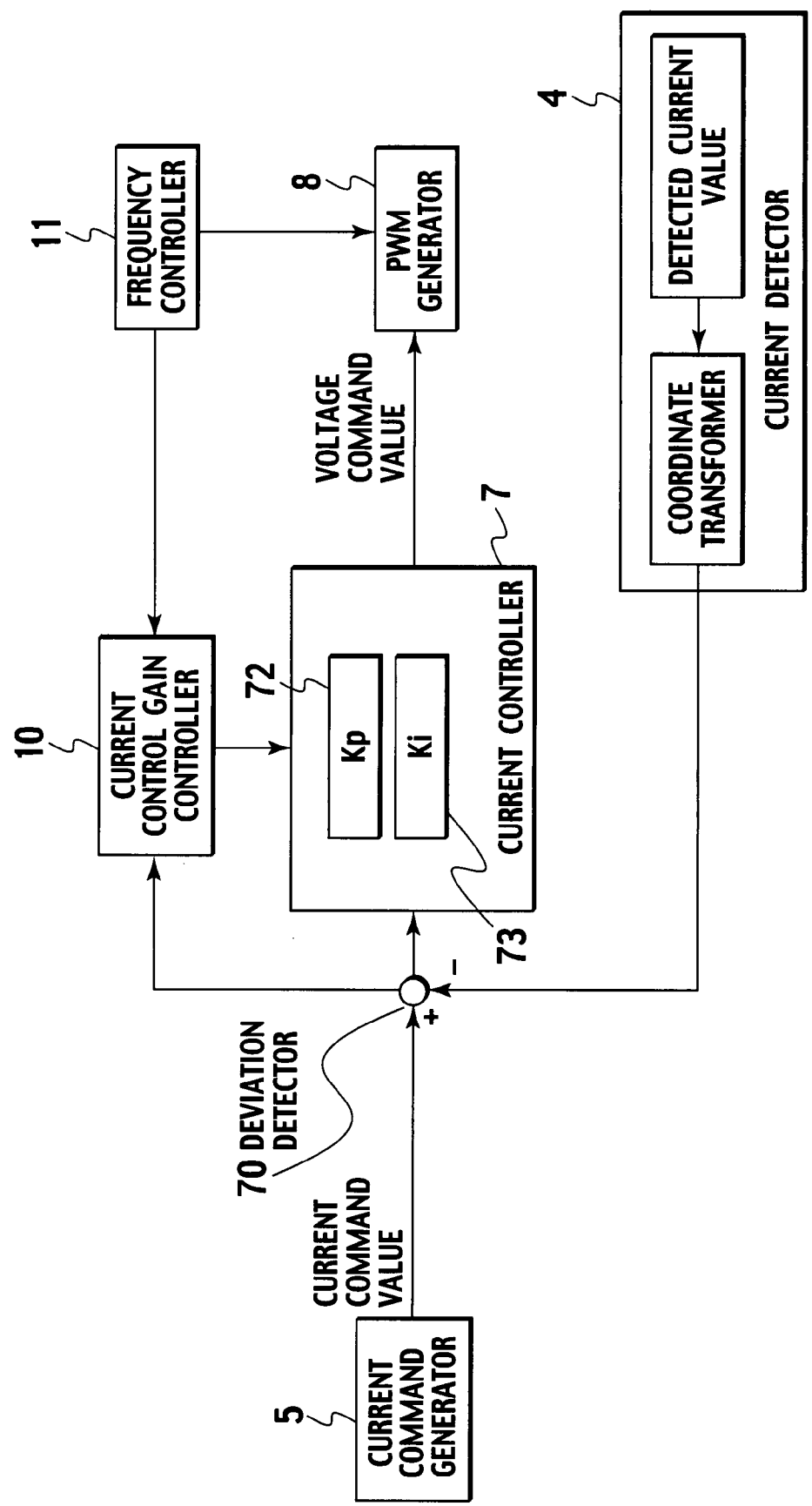
FIG. 20 is a block diagram of a current controller according to the fifth embodiment.

FIG. 20 is a block diagram showing the configuration of the current controller 7 within the controller 6. As shown in FIG. 20, the deviation detector 70 detects the deviation of the detected current value from the current detector 4 from the current command value from the current command generator 5. Incidentally, the detected current value from the current detector 4 is obtained in the following manner. For example, the current detector 4 detects the values of the U-phase, V-phase and W-phase currents (or the three-phase alternating current as an example) which the power converter 2 (or the PWM inverter) supplies to the motor that acts as the load 3, and the coordinate transformer performs transformation (or three-phase-to-two-phase transformation) to transform the U-phase, V-phase and W-phase current values into the d-coordinate and q-coordinate current values.

The current control gain controller 10 effects a change in the current control gain of the current controller 7 according to the change in the carrier frequency from the frequency controller 11, and also effects a change in the range of the current control gain according to the deviation from the deviation detector 70 (as will be described in detail later).

The current controller 7 includes a proportional term calculator 72 and an integral term calculator 73 as structural components, and outputs the voltage command value by performing proportional-plus-integral control (PI-control) on the deviation of the detected current value from the current command value. The current controller 7 is configured to change the proportional term of the proportional term calculator 72 according to the signal from the current control gain controller 10 to thereby change the output voltage command value according to the change in the carrier frequency and also to change the range thereof according to the deviation. Although the proportional-plus-integral control is given in FIG. 20 as an example of the current control of the current controller 7, the proportional control alone may be employed as shown in FIG. 2.

Figure 21:
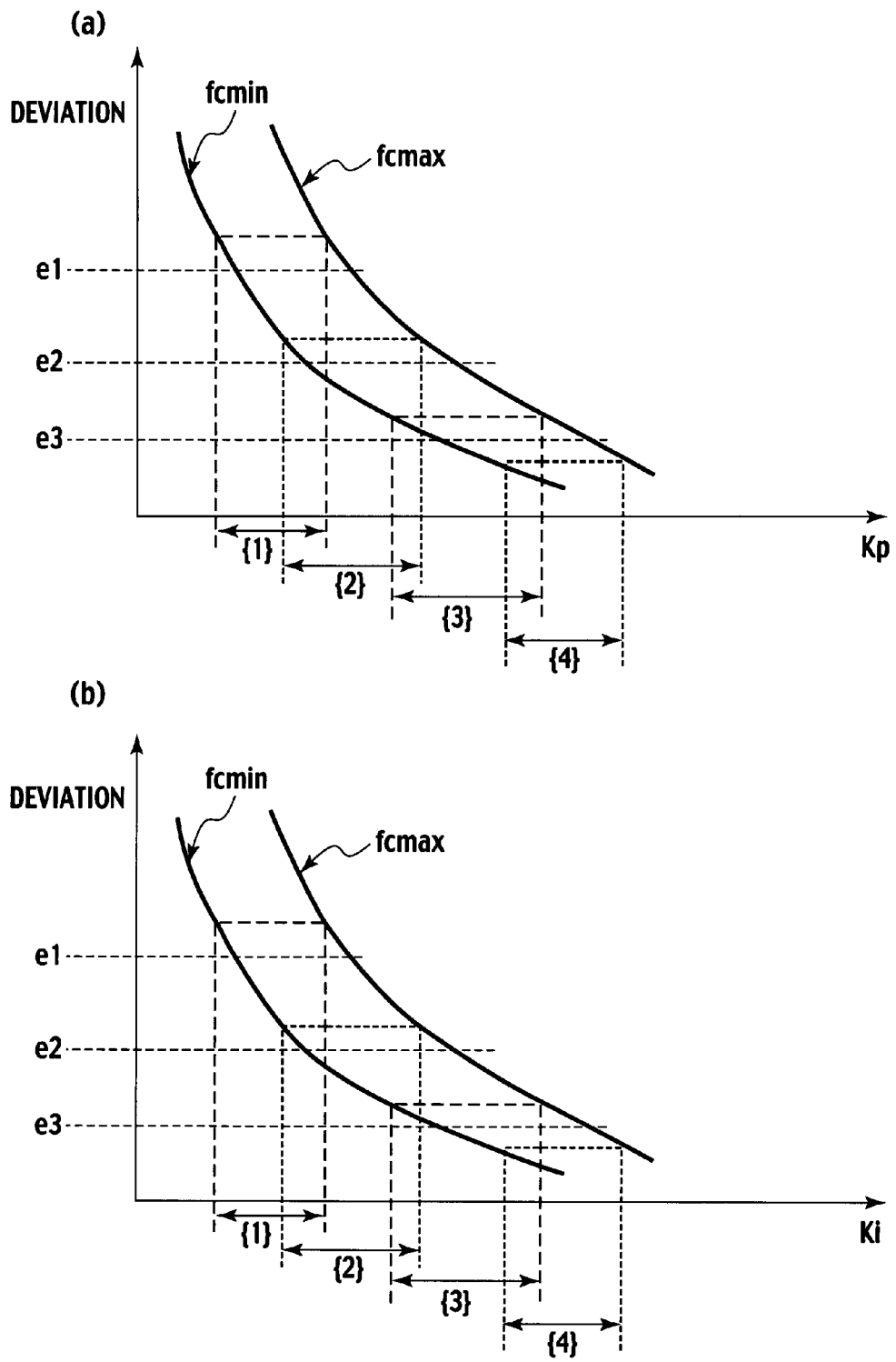
FIG. 21(a) is a characteristic plot showing the relation between a proportional gain and the offset of the current value in a transition state.
FIG. 21(b) is a characteristic plot showing the relation between an integral gain and the offset of the current value in a transition state.

FIGS. 21(a) and (b) are plots of assistance in explaining a method of controlling the current control gain (or a proportional gain and an integral gain) of the current controller 7, showing the change in the deviation due to a predetermined carrier frequency. In FIG. 21(a), the horizontal axis indicates the proportional gain Kp of the current controller 7 as supplied with input of varying current command values, and the vertical axis indicates the difference between the current command value and the detected current value (that is, the offset or the deviation). In FIG. 21(b), the horizontal axis indicates the integral gain Ki of the current controller 7 as supplied with input of varying current command values, and the vertical axis indicates the difference between the current command value and the detected current value (that is, the offset or the deviation). In FIGS. 21(a) and 21(b), fcmax and fcmin represent characteristic curves corresponding to the upper limit value and the lower limit value, respectively, of the carrier frequency.

In the transition state, the deviation also changes incident to the change in the current command value. A magnitude of deviation is divided into four parts by predetermined reference values $e1$, $e2$ and $e3$. When a deviation $e$ is equal to or more than the value $e1$ ($e \geq e1$), the range of the gain Kp is set to $\{1\}$, and the gain Kp is changed within the range $\{1\}$ in synchronization with the carrier. When the deviation $e$ lies between the value $e2$ inclusive and the value $e1$ exclusive ($e1 > e \geq e2$), the range of the gain Kp is set to $\{2\}$, and the gain Kp is changed within the range $\{2\}$. Likewise, the gain Kp is changed within the range $\{3\}$ in synchronization with the carrier when the deviation $e$ lies between the value $e3$ inclusive and the value $e2$ exclusive ($e2 > e \geq e3$), or the gain Kp is changed within the range $\{4\}$ in synchronization with the carrier when the deviation $e$ is less than the value $e3$ ($e3 > e$). The range of change of Ki is determined similarly to the case of proportional gain Kp.

In other words, the range of the gains Kp and Ki are changed according to the magnitude of the deviation $e$. In FIG. 21(a), the range of the gain Kp is set according to the mean value of the upper limit values (corresponding to the curve fcmax) of the current control gain and the mean value of the lower limit values (corresponding to the curve fcmin) thereof in each of divided deviation regions. For example, when the deviation $e$ lies between the value $e2$ inclusive and the value $e1$ exclusive ($e1 > e \geq e2$), the mean value of the gains Kp corresponding to the curve fcmax ranging from the value $e1$ to the value $e2$ is the upper limit value of the range $\{2\}$, and the mean value of the gains Kp corresponding to the curve fcmin ranging from the value $e1$ to the value $e2$ is the lower limit value of the range $\{2\}$.

Incidentally, the range is not limited to being set by dividing the magnitude of deviation and determining the mean values as described above but may be set corresponding to each deviation.

FIG. 22(a) is a plot showing the relation between the carrier frequency and the proportional gain. FIG. 22(b) is a plot showing the relation between the carrier frequency and the integral gain. In FIGS. 22(a) and (b), the vertical axes indicate the current control gain, and the horizontal axes indicate the carrier frequency. As can be seen from FIGS. 22(a) and (b), the carrier frequency is substantially linearly proportional to the proportional gain, and also to the integral gain.

Although it is possible that proportional gains or integral gains are brought into correspondence with all varying carrier frequencies (or periods) to determine the proportional gain or the integral gain that makes the deviation constant, linear approximate expressions obtained from the relations shown in FIGS. 22(a) and (b) can be used to determine the proportional gain or the integral gain from the upper and lower limit values thereof. When the ranges $\{1\}$ to $\{4\}$ and the upper and lower limit values of the proportional gain or the integral gain are determined as previously mentioned, the upper and lower limit values fcmax and fcmin of the carrier frequency (or period) that makes the deviation constant can be therefore set in combination with the corresponding upper and lower limit values Kpmax and Kpmin of the proportional gain or Kimax and Kimin of the integral gain.

Figure 23:
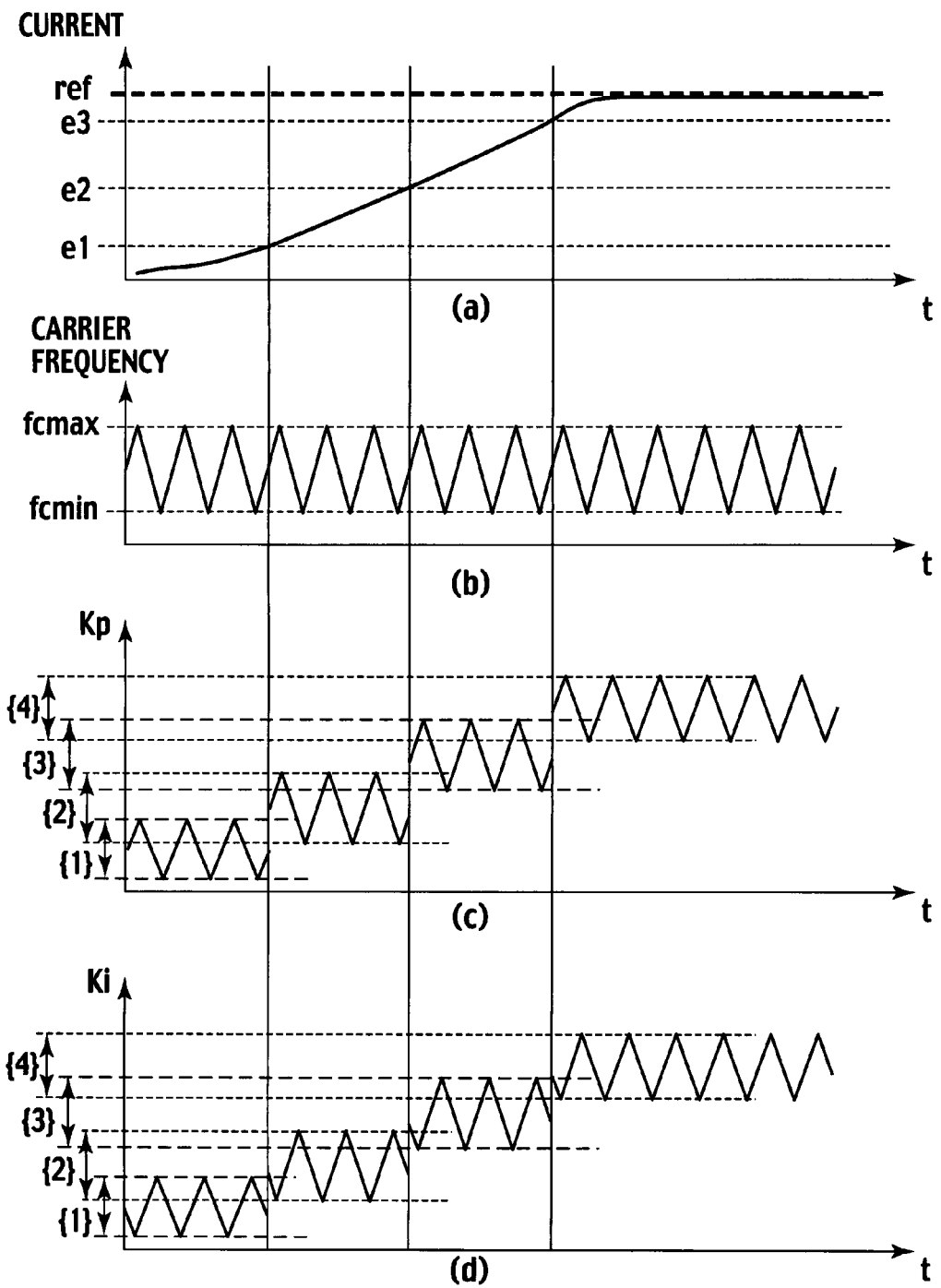
FIGS. 23(a) to 23(d) are charts showing the waveforms of a carrier frequency fc and the proportional gain Kp and the integral gain Ki in the current controller shown in FIG. 20, with respect to time.

FIGS. 23(a) to 23(d) are charts showing the waveforms of a carrier frequency fc and the proportional gain Kp and the integral gain Ki set by using FIGS. 21(a) to 22(b), with respect to time. FIG. 23(a) shows the waveform of an output current response to a current command value ref with respect to time. FIG. 23(b) shows a change in the carrier frequency fc from the carrier generator 9 with respect to time. FIG. 23(c) shows a change in the proportional gain Kp of the current controller 7 as supplied with an input of the current command value ref. FIG. 23(d) shows a change in the integral gain Ki of the current controller 7 as supplied with an input of the current command value ref.

In FIG. 23(a), a difference between a broken line (i.e., the current command value ref) and a solid line (i.e., the detected current value) corresponds to the deviation. In FIG. 23(a), e1, e2 and e3 denote the reference values by which the magnitude of deviation is divided as mentioned above. The proportional gain Kp shown in FIG. 23(c) changes in synchronization with the change in the carrier frequency fc with respect to time shown in FIG. 23(b), and also, the range of the gain Kp varies from {1} to {4} according to the deviation shown in FIG. 23(a).

Although FIGS. 23(a) to 23(d) give an instance where the magnitude of deviation is divided by the reference values e1, e2 and e3, the number of divided regions is not limited to this instance.

The above-described configuration enables changing the range of the current control gain according to the deviation of the output current from the current command value.

In addition to the above, matters described with reference to the first to fourth embodiments may be applied to the fifth embodiment. Specifically, the matters include the following configuration: when the frequency controller effects a periodic change in the carrier frequency or when a delay occurs in the voltage command value fed from the current controller to the PWM generator, the current control gain value given by the command from the current control gain controller is held for the duration of a predetermined number of calculations, and the current controller uses the held current control gain value for next calculation to calculate the voltage command value.

Sixth Embodiment

Figure 24:
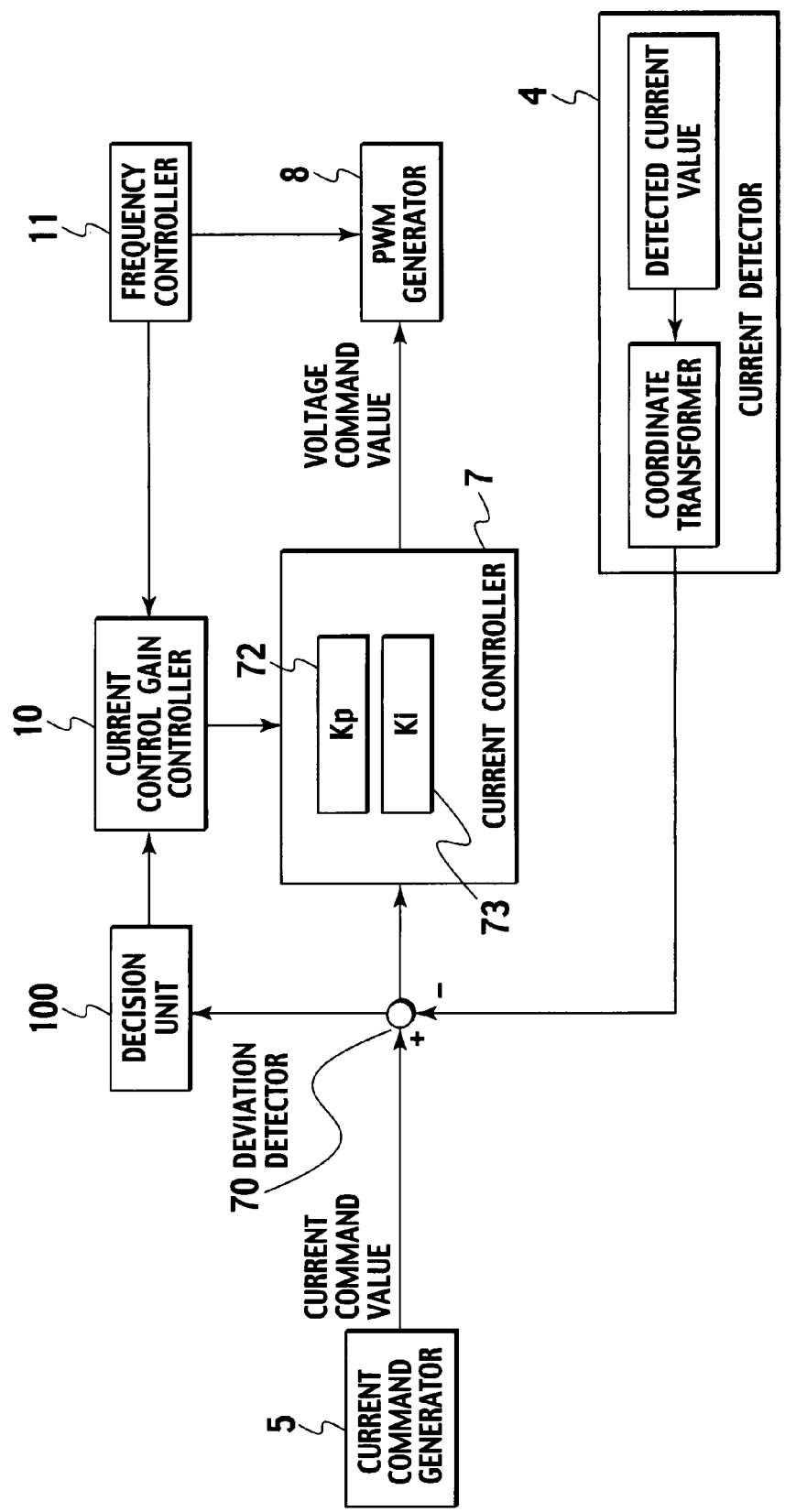
FIG. 24 is a block diagram showing a device for controlling a power converting device according to a sixth embodiment of the present invention.

FIG. 24 is a block diagram showing a device for controlling a power converting device according to a sixth embodiment of the present invention. In FIG. 24, the same parts are designated by the same reference numerals shown in FIG. 20.

The control device according to the sixth embodiment is configured of the control device according to the fifth embodiment as provided with addition of a decision unit 100 that determines the magnitude of the deviation.

Description will be provided below with reference to FIGS. 25(a) to 25(e) with regard to operation of the decision unit 100 and a method of determining the gain Kp.

Figure 25:
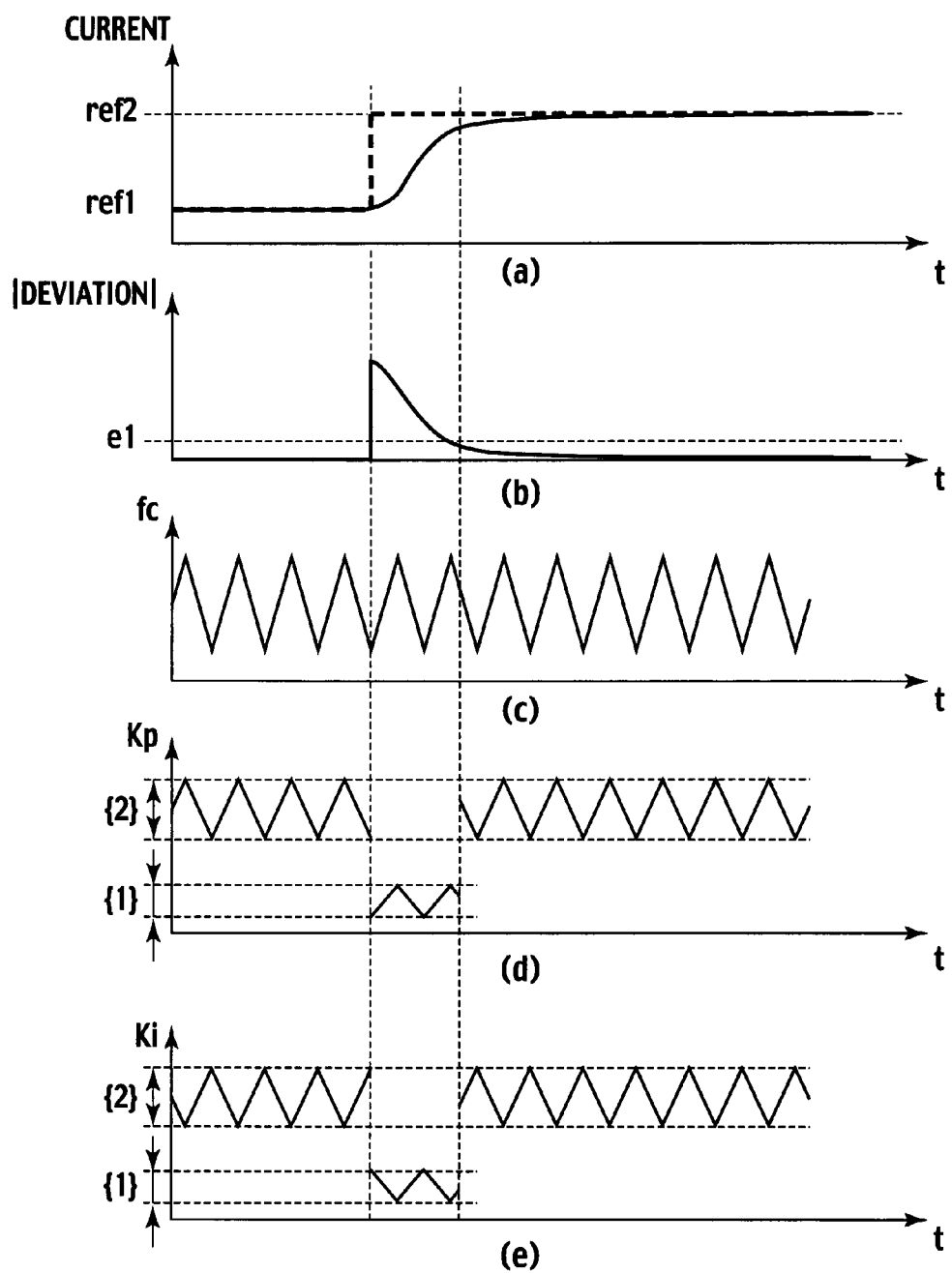
FIGS. 25(a) to 25(e) are charts showing the waveforms of the carrier frequency fc, the proportional gain Kp and the integral gain Ki and a deviation in the control device shown in FIG. 24, with respect to time.

FIG. 25(a) shows the waveform of the output response to the current command value with respect to time, which develops when the current command value changes from ref1 to ref2. FIG. 25(b) shows a change in the magnitude (or the absolute value) of the deviation with respect to time, which occurs in a situation shown in FIG. 25(a). FIG. 25(c) shows a change in the carrier frequency. FIG. 25(d) shows a change in the gain Kp, which occurs in a situation shown in FIG. 25(c). FIG. 25(e) shows a change in the gain Ki, which occurs in a situation shown in FIG. 25(c).

When the value e1, as shown for example in FIG. 25(b), is used as the reference value for the decision unit 100 to make a determination, the range of the gain Kp is set to {2} if the absolute value of the deviation is equal to or more than the value e1, or the range of the gain Kp is set to {1} if the absolute value of the deviation is less than the value e1. This enables reducing an overshoot in the transition state and thus improving controllability in the transition state.

Although the leading edge of the current command value is given as an instance in FIGS. 25(a) to 25(e), the sixth embodiment can also have the same effect on the trailing edge of the current command value.

Figure 26:
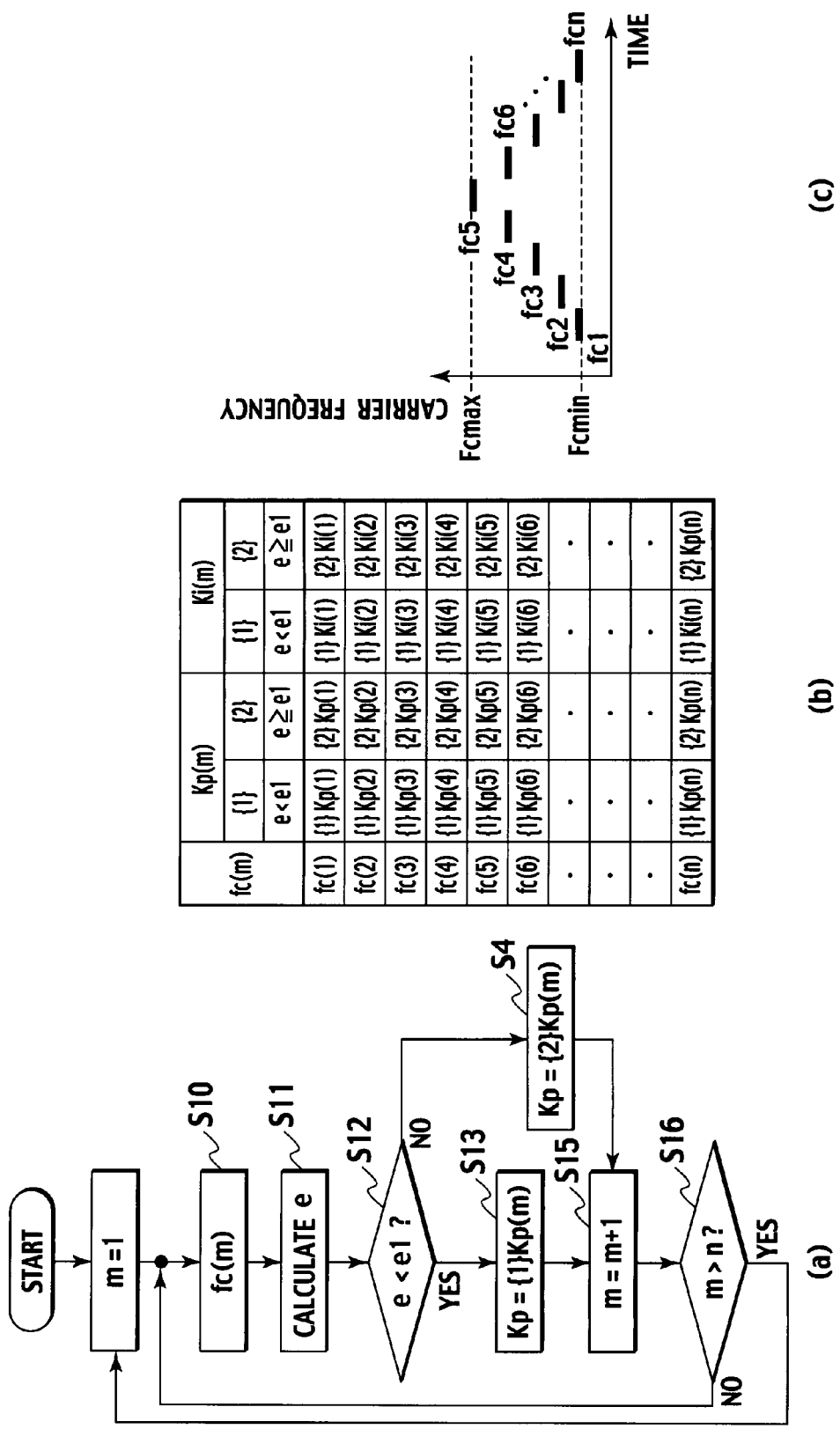
FIGS. 26(a) to 26(c) show a calculation flowchart and a map for control by the control device shown in FIG. 24.

FIGS. 26(a) to 26(c) show a calculation flowchart and a map for use in control described with reference to FIGS. 25(a) to 25(e).

First, varying PWM carrier frequencies are set to fc(1) to fc(n) as shown in FIG. 26(c). In FIG. 26(c), fc(1) to fc(n) are represented as fc1 to fcn, respectively.

Then, an fc-Kp,Ki (carrier frequency versus gains) map is created as shown in FIG. 26(b). Values in the map can be utilized for control to effect a synchronous change in the carrier frequency fc and the gains Kp and Ki.

The {1}Kp column in FIG. 26(b) is composed of combinations of the carrier frequencies fc and the gains Kp that make the deviations constant according to the number of divided carrier frequencies fc in the range of the carrier frequency (between fcmin and fcmax) in a section {1} of the gain Kp shown in FIG. 21(a). In other words, the ranges {1}Kp(1) to {1}Kp(n) correspond to the carrier frequencies fc(1) to fc(n), respectively, in the section {1} of the gain Kp, and take on the Kp values that make the deviations constant. As in the case of the {1}Kp column, the {2}Kp column is composed of combinations of the carrier frequencies fc and the gains Kp that make the deviations constant according to the number of divided carrier frequencies fc in the range of the carrier frequency (between fcmin and fcmax) in a section {2} of the gain Kp shown in FIG. 21(a).

Description will now be given with regard to a calculating process shown in FIG. 26(a). When calculation starts, the counter's value m is first set to 1. At step S10, the carrier frequency is set to fc(1). At step S11, the value of the deviation e is calculated. At step S12, the value of the deviation e is compared to the reference value e1. When the absolute value of the deviation e is less than the reference value e1, the process proceeds to step S13. At step S13, the {1}Kp(1) value is set as the gain Kp and the {1}Ki(1) value is set as the gain Ki of the current controller 7 shown in FIG. 24, and the process proceeds to step S15. At step S15, the counter's value m is counted up. At step S16, the counter's value m is compared to the n value. When the counter's value m is less than the n value, the process returns to step S11, and then the above calculation is repeated. When at step S12 comparison shows that the deviation e is equal to or more than the reference value e1, the process proceeds to step S14. At step S14, the {2}Kp (2) value is set as the gain Kp and the {2}Ki(2) value is set as the gain Ki, and the process proceeds to step S15.

The control shown in FIGS. 25(a) to 25(e) can be accomplished by the above process.

Seventh Embodiment

Figure 27:
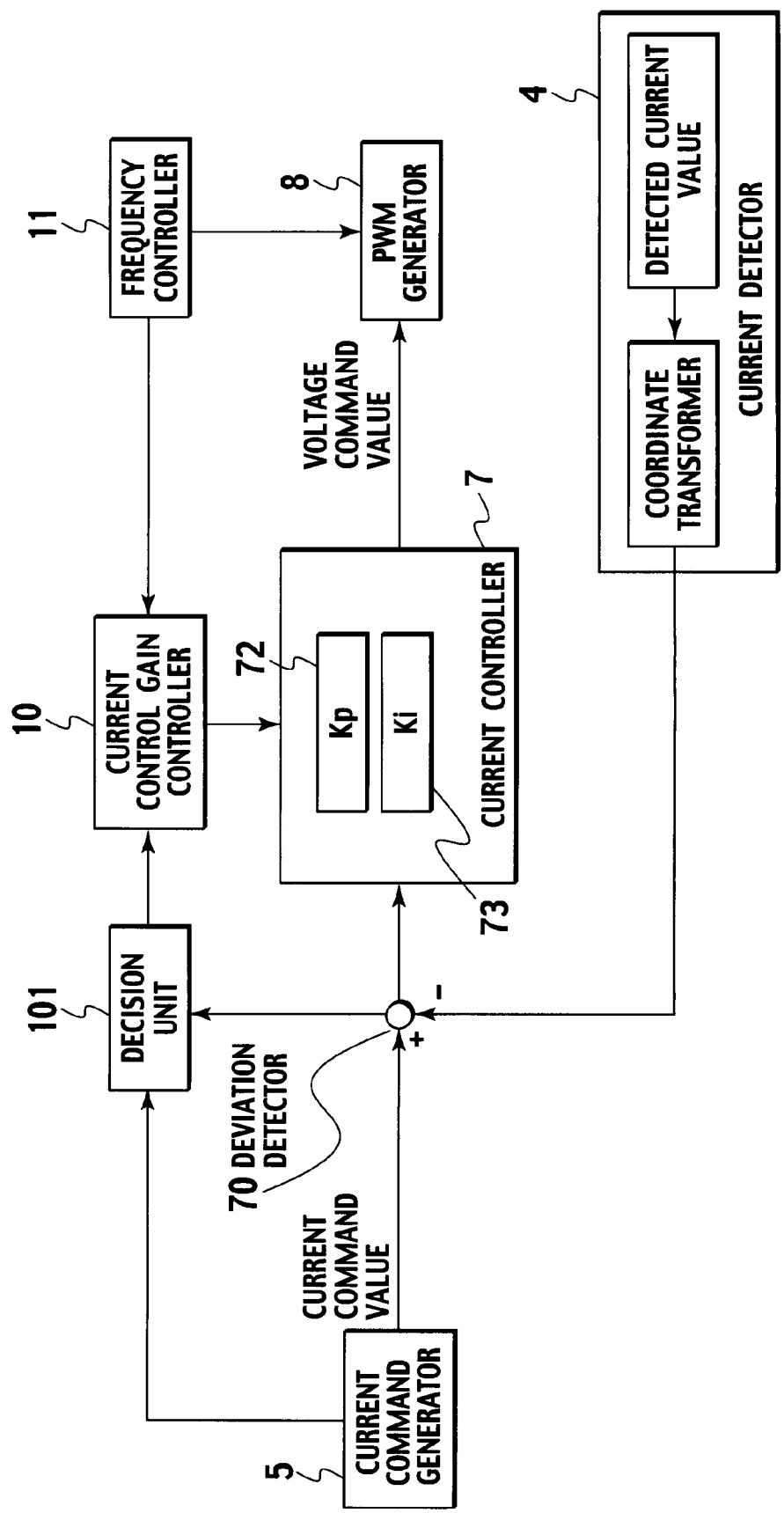
FIG. 27 is a block diagram showing a device for controlling a power converting device according to a seventh embodiment of the present invention.

FIG. 27 is a block diagram showing a device for controlling a power converting device according to a seventh embodiment of the present invention. In FIG. 27, the same parts are designated by the same reference numerals shown in FIG. 20.

The control device according to the seventh embodiment is configured of the control device according to the fifth embodiment as provided with addition of a decision unit 101 that determines the ratio of the magnitude (or the absolute value) of the deviation to the magnitude (or the absolute value) of the change in the current command value.

Description will be provided below with reference to FIGS. 28(a) to 28(d) with regard to operation of the decision unit 101 and a method of determining the gain Kp.

Figure 28:
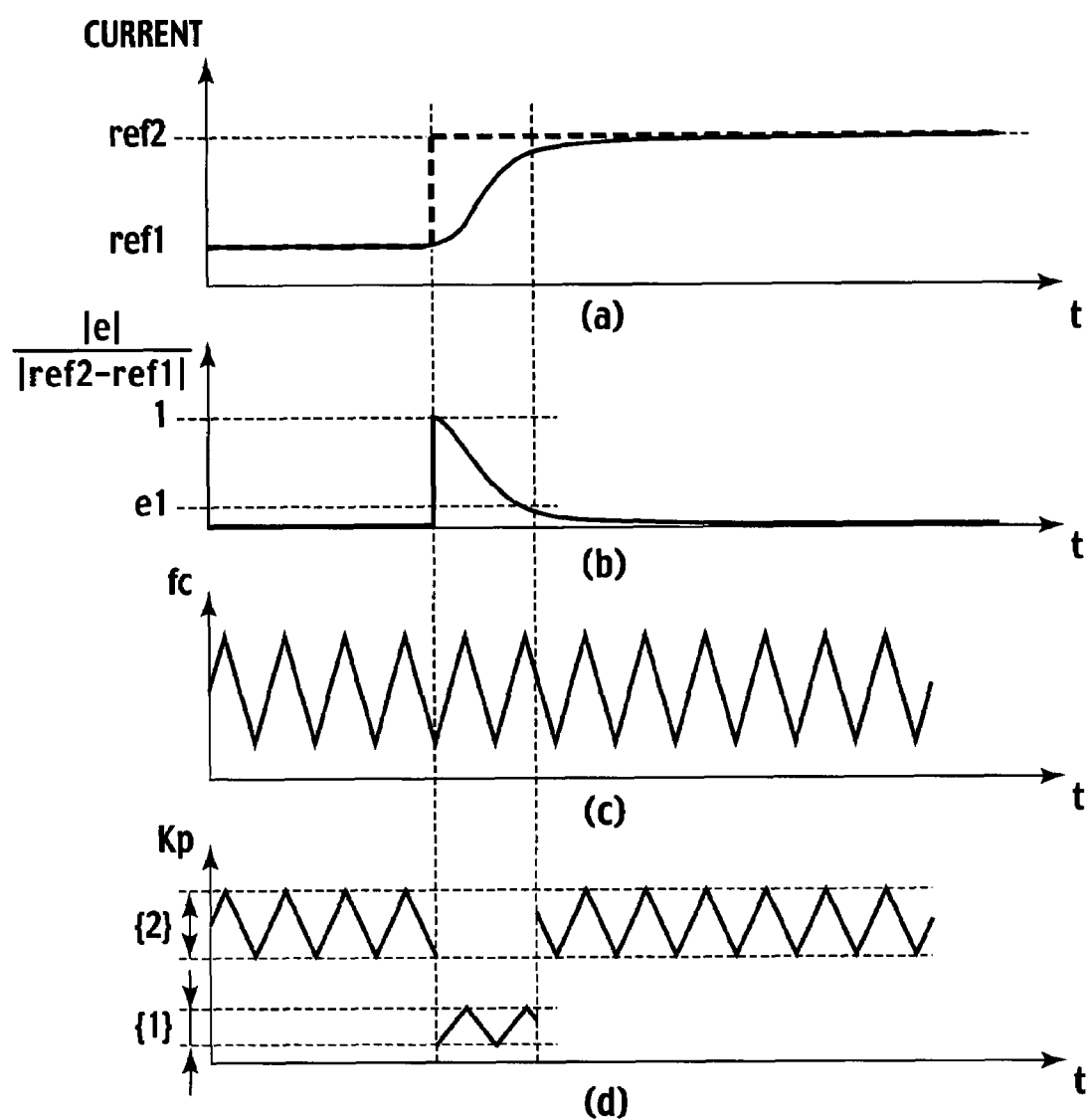
FIGS. 28(a) to 28(d) are charts showing the carrier frequency fc, the proportional gain Kp and the ratio of the magnitude (or the absolute value) of the deviation to the magnitude (or the absolute value) of a change in a current command value in the control device shown in FIG. 27.

FIG. 28(a) shows the waveform of the output response to the current command value with respect to time, which develops when the current command value changes from ref1 to ref2. FIG. 28(b) shows a change, with respect to time, in the ratio of the magnitude (or the absolute value) of the deviation to the amount (or the absolute value) of the change in the current command value, which occurs in a situation shown in FIG. 28(a). FIG. 28(c) shows a change in the carrier frequency. FIG. 28(d) shows a change in the gain Kp, which occurs in a situation shown in FIG. 28(c).

When the value e1, as shown for example in FIG. 28(b), is used as the reference value for the decision unit 101 to make a determination, the range of the gain Kp is set to {2} if the ratio of the magnitude of the deviation to the amount of change in the current command value is equal to or less than the value e1, or the range of the gain Kp is set to {1} if the ratio of the magnitude of the deviation to the amount of change in the current command value is more than the value e1. This enables reducing the overshoot in the transition state and thus improving the controllability in the transition state.

Although the leading edge of the current command value is given as an instance in FIGS. 28(a) to 28(d), the seventh embodiment can also have the same effect on the trailing edge of the current command value. Moreover, the ratio of the magnitude (or the absolute value) of the deviation to the amount (or the absolute value) of the change in the current command value is used, so that the reference value e1 for determination can be set as a percentage (%) to the amount of change in the current command value.

When the PWM carrier frequency is changed in order to eliminate switching noise of higher harmonics produced by the PWM signal turning on or off the switching element of the power converting device, periodic variations caused by the change in the PWM carrier frequency occur in the output current waveform from the power converting device. According to the embodiments described above, the control device and method can suppress the occurrence of the periodic variations due to the change in the PWM carrier frequency in the output current waveform from the power converting device, by effecting a change in the current control gain for conversion of the current command value to the voltage command value according to the change in the PWM carrier frequency. Thus, the control device and method achieve the effect of being able to eliminate a malfunction such as torque variations occurring in the load driven by the power converting device. As for a transient response to the current command value, the control device and method can effect a change in the current control gain of the current controller according to the change in the PWM carrier frequency from the carrier generator, and also can effect a change in the range of the current control gain according to the deviation of the output current from the power converting device from the given current command value. Thus, the control device and method achieve the effect of being able to improve the transient characteristics of the output current waveform from the power converting device.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2006-122093, filed on Apr. 26, 2006, and Japanese Patent Application No. 2007-031584, filed on Feb. 13, 2007, the disclosures of which are expressly incorporated herein by reference in their entirety.

What is claimed is:

1. A control device for a power converting device which performs pulse width modulation (PWM) on an output from a direct current power supply and thereby produces an output of alternating current power, comprising:
   a current controller which converts a given current command value into a voltage command value;
   a carrier generator which generates a pulse width modulation (PWM) carrier;
   a PWM generator which generates a pulse width modulated (PWM) signal to be fed to the power converting device according to the voltage command value and the pulse width modulation (PWM) carrier;
   a frequency controller which effects a periodic change in a frequency of the pulse width modulation (PWM) carrier from the carrier generator; and
   a current control gain controller which effects a change in a current control gain of the current controller according to the periodic change in the frequency of the pulse width modulation (PWM) carrier.

2. The control device for the power converting device according to claim 1, wherein when a delay occurs in the voltage command value fed from the current controller to the PWM generator, a held current control gain value given by a command from the current control gain controller is held for a duration of a predetermined number of calculations, and the current controller uses the held current control gain value for a next calculation to calculate the voltage command value.

3. A control method for a power converting device which performs pulse width modulation (PWM) on an output from a direct current power supply and thereby produces an output of alternating current power, comprising:
   converting a given current command value into a voltage command value;
   generating a pulse width modulated (PWM) signal to be fed to the power converting device according to the voltage command value and a pulse width modulation (PWM) carrier;
   effecting a periodic change in a frequency of the pulse width modulation (PWM) carrier; and
   effecting a change in a current control gain for conversion of the given current command value to the voltage command value according to the periodic change in the frequency of the pulse width modulation (PWM) carrier.

4. The control method for the power converting device according to claim 3, wherein when a delay in the pulse width modulation (PWM) carrier occurs, a value of the current control gain is held for a duration of a predetermined number of calculations, and the held current control gain value is used for a next calculation to calculate the voltage command value.

5. A control device for a power converting device which performs pulse width modulation (PWM) on an output from a direct current power supply and thereby produces an output of alternating current power, comprising:
   a current controller which converts a given current command value into a voltage command value;
   a carrier generator which generates a pulse width modulation (PWM) carrier;
   a PWM generator which generates a pulse width modulated (PWM) signal to be fed to the power converting device according to the voltage command value and the pulse width modulated (PWM) carrier;
   a frequency controller which effects a change in the frequency of the pulse width modulated (PWM) carrier from the carrier generator;
   a current control gain controller which effects a change in a current control gain of the current controller according to the change in the frequency of the pulse width modulated (PWM) carrier; and
   a deviation detector which detects a deviation of an output current from the power converting device from the given current command value,
   wherein the current control gain of the current controller is changed according to the change in the frequency of the PWM carrier from the carrier generator, and a range of the current control gain is changed according to the deviation.

6. The control device for the power converting device according to claim 5, wherein a magnitude of the deviation is divided into a plurality of sections, and the range of the current control gain is set according to a mean value of upper limit values of the current control gain and a mean value of lower limit values thereof in each of the plurality of sections.

7. The control device for the power converting device according to claim 5, further comprising a decision unit which determines whether or not an absolute value of the deviation is more than a predetermined reference value,
wherein the range of the current control gain is set when the absolute value of the deviation is more than the predetermined reference value, as distinct from when the absolute value of the deviation is equal to or less than the predetermined reference value.

8. The control device for the power converting device according to claim 5, further comprising a decision unit which determines whether or not a ratio of an absolute value of a magnitude of the deviation to an absolute value of a magnitude of a change in the current command value is more than a predetermined reference value,
wherein the range of the current control gain is set when the ratio of the absolute value of the magnitude of the deviation to the absolute value of the magnitude of the change in the current command value is more than the predetermined reference value, as distinct from when the ratio is equal to or less than the predetermined reference value.

9. A control method for a power converting device which performs pulse width modulation (PWM) on an output from a direct current power supply and thereby produces an output of alternating current power, comprising:
converting a given current command value into a voltage command value;
generating a pulse width modulated (PWM) signal to be fed to the power converting device according to the voltage command value and a pulse width modulation (PWM) carrier;
effecting a change in a frequency of the pulse width modulation (PWM) carrier;
detecting a deviation of an output current from the power converting device from the given current command value; and
effecting a change in a current control gain for conversion of the given current command value to the voltage command value according to the change in the frequency of the pulse width modulation (PWM) carrier, and effecting a change in a range of the current control gain according to the deviation.

10. The control method for the power converting device according to claim 9, wherein a magnitude of the deviation is divided into a plurality of sections, and the range of the current control gain is set according to a mean value of upper limit values of the current control gain and a mean value of lower limit values thereof in each of the plurality of sections.

11. The control method for the power converting device according to claim 9, further comprising determining whether or not an absolute value of the deviation is more than a predetermined reference value,
wherein the range of the current control gain is set when the absolute value of the deviation is more than the predetermined reference value, as distinct from when the absolute value of the deviation is equal to or less than the predetermined reference value.

12. The control method for the power converting device according to claim 9, further comprising determining whether or not a ratio of an absolute value of a magnitude of the deviation to an absolute value of a magnitude of a change in the current command value is more than a predetermined reference value,
wherein the range of the current control gain is set when the ratio of the absolute value of the magnitude of the deviation to the absolute value of the magnitude of the change in the current command value is more than the predetermined reference value, as distinct from when the ratio is equal to or less than the predetermined reference value.

* * * * *